(12) United States Patent
Kobayashi et al.

(10) Patent No.: US 6,324,145 B1
(45) Date of Patent: Nov. 27, 2001

(54) DIGITAL DATA REPRODUCING APPARATUS AND REPRODUCTION SIGNAL BINARIZATION LEVEL CORRECTING METHOD

(75) Inventors: Motoyuki Kobayashi, Nara; Ryusuke Horibe, Hirakata; Yasuki Matsumoto, Takaraduka; Yasuaki Edahiro, Habikino, all of (JP)

(73) Assignee: Matsushita Electric Industrial Co., Ltd, Kadoma (JP)

( * ) Notice: Subject to any disclaimer, the term of this patent is extended or adjusted under 35 U.S.C. 154(b) by 0 days.

(21) Appl. No.: 09/297,759

(22) PCT Filed: Nov. 27, 1998

(86) PCT No.: PCT/JP98/05359

§ 371 Date: Jul. 12, 1999

§ 102(e) Date: Jul. 12, 1999

(87) PCT Pub. No.: WO99/28908

PCT Pub. Date: Jun. 10, 1999

(30) Foreign Application Priority Data

Nov. 28, 1997 (JP) .................................. 9-327783
Oct. 30, 1998 (JP) ................................. 10-310001

(51) Int. Cl.[7] .............................. G11B 7/00; G11B 20/10
(52) U.S. Cl. .................................. 369/59.17; 369/59.13; 369/59.19; 369/124.05; 369/124.15
(58) Field of Search .................. 369/59, 124.05, 369/124.14, 124.15, 124.1, 124.11, 124.12, 124.13, 59.13, 59.19, 59.2, 59.17

(56) References Cited

U.S. PATENT DOCUMENTS 4,005,477  1/1977  Ottesen ............................. 360/51
5,359,585  10/1994  Tanoue et al. ..................... 369/59
5,663,942  * 9/1997  Ishibashi et al. .................. 369/59
5,848,036  * 12/1998  Ishibashi et al. ............... 369/44.35

FOREIGN PATENT DOCUMENTS

05006619 A   1/1993  (JP) .
05266485 A  10/1993  (JP) .
08017139     1/1996  (JP) .
08087756     2/1996  (JP) .
09073726 A   3/1997  (JP) .

OTHER PUBLICATIONS

Press, W.H. et al.; "Numerical Recipes: The Art of Scientific Computing" 1988, Cambridge University Press, pp. 274–334.

* cited by examiner

Primary Examiner—Thang V. Tran
(74) Attorney, Agent, or Firm—Renner, Otto, Boisselle & Sklar, LLP

(57) ABSTRACT

The present invention has an objective of providing a digital data reproduction apparatus and a method for correcting a reproduced signal digitization level in which the signal quality of a reproduced signal from a recording medium is kept high while ensuring the reproduction stability. The digital data reproduction apparatus includes: reproduced signal digitization means for digitizing a reproduced signal; synchronization means for producing a clock whose phase is synchronized with a leading edge and a trailing edge of the digitized signal produced by the reproduced signal digitization means; and jitter detection means for integrating and thereby converting absolute values of phase errors between the digitized signal and the clock to a voltage value. The apparatus further includes digitization level correction means for correcting a reproduced signal digitization level so as to minimize a signal produced by the jitter detection means.

13 Claims, 24 Drawing Sheets

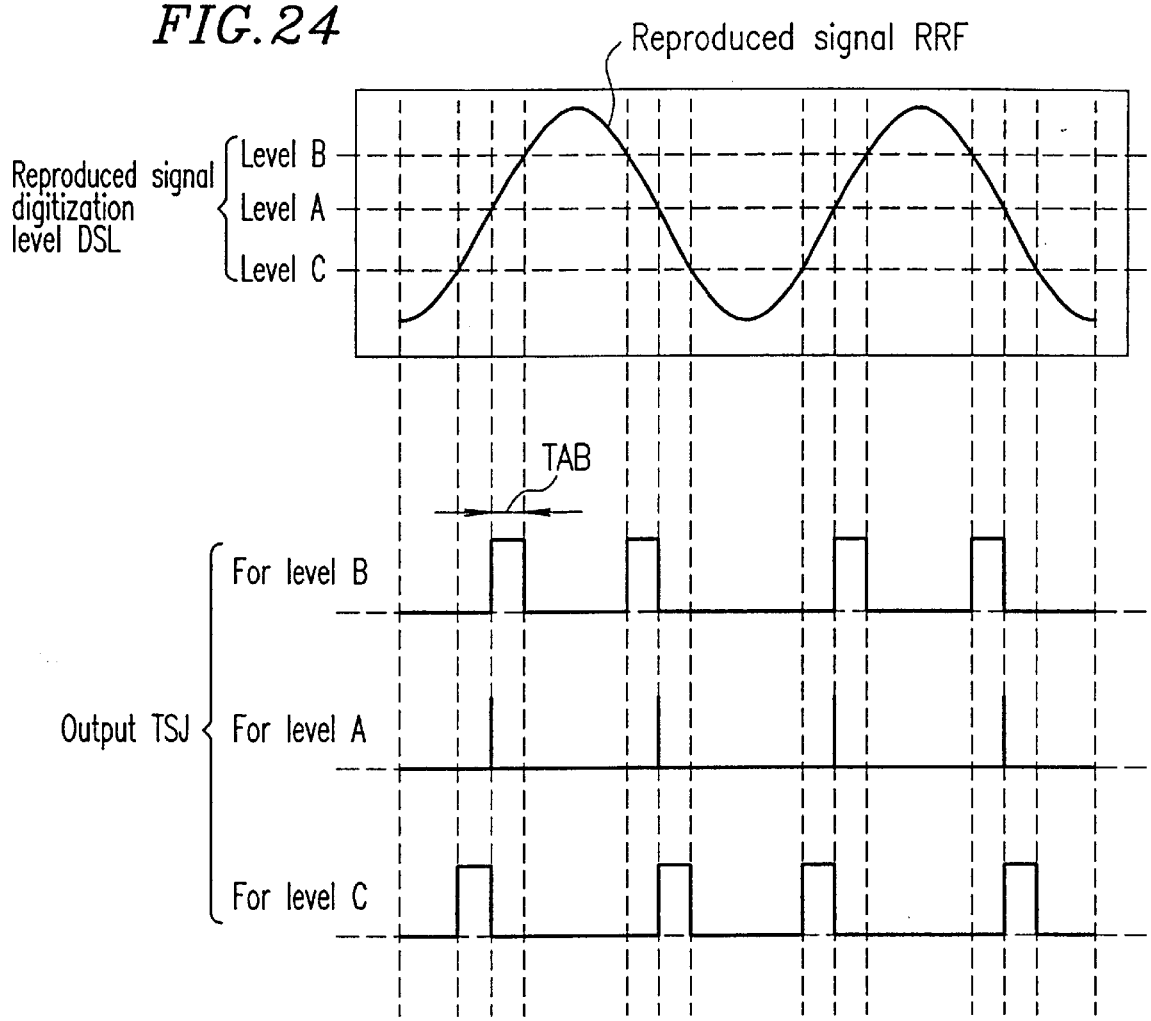

DIGITAL DATA REPRODUCING APPARATUS AND REPRODUCTION SIGNAL BINARIZATION LEVEL CORRECTING METHOD

TECHNICAL FIELD

The present invention relates to a digital data reproduction apparatus for reproducing a recording medium, such as an optical disk or a magneto-optical disk, on which digital data such as video, sound or text has been recorded.

BACKGROUND ART

Recently, various types of digital data reproduction apparatuses have been suggested for reproducing a recording medium, such as an optical disk, a magneto-optical disk or a magnetic tape, on which digital data such as video, sound or text has been recorded.

An exemplary conventional digital data reproduction apparatus will now be described with reference to the drawings.

FIG. 23 is a block diagram of a conventional digital data reproduction apparatus outputting reproduced data.

In FIG. 23, reference numeral 101 denotes an optical disk on which digital data such as video, sound or text data has been recorded. Reference numeral 102 denotes a pick up which is used as a detector for reading data on the optical disk 101, and includes an actuator provided therein. Reference numeral 103 denotes waveform equalization means for performing a waveform equalization operation on a signal DRF, which has been obtained by reading data from the optical disk 101 with the pick up 102, so as to produce an equalized reproduced signal RRF. Reference numeral 104 denotes error signal production means for performing an arithmetic operation on the signal DRF obtained by the pick up 102 so as to produce an error signal ERS which is required for a control operation, and for performing a fine adjustment of the error signals ERS using a jitter detection signal JTR from jitter detection means 108. Reference numeral 105 denotes control means for controlling focusing, tracking, traversing, or the like, of the pick up 102 using the error signals ERS.

Reference numeral 106 denotes reproduced signal digitization means for digitizing the reproduced signal RRF, whose waveform has been equalized by the waveform equalization means 103, by comparing the signal RRF with a reference digitization level. The reproduced signal RRF is digitized by the reproduced signal digitization means 106 and output as reproduced data DDS. Reference numeral 107 denotes synchronization means for producing a clock TSJ whose phase is synchronized with the leading and trailing edges of the digitized signal which has been digitized by the reproduced signal digitization means 106. Reference numeral 108 denotes jitter detection means for detecting a jitter component contained in the reproduced signal DDS which has been digitized by the reproduced signal digitization means, so as to output the level thereof as the jitter detection signal JTR. The jitter detection method includes the method disclosed in Japanese Laid-Open Patent Publication No. 8-87756.

Now, a correlation representing the variation in the jitter level JTR with respect to the reproduced signal digitization level DSL will be described, along with the operating principle of the synchronization means 107, with reference to FIGS. 24 and 2.

FIG. 24 is a principle diagram showing a characteristic correlation between the reproduced signal digitization level DSL and the jitter level JTR, wherein the waveform on the upper portion of the figure is the reproduced signal RRF which is input to the reproduced signal digitization means 106, and the waveforms on the lower side of the figure are each an output TSJ to be output from the synchronization means 107 which is obtained by digitizing the reproduced signal RRF with one of the respective levels A, B and C of the reproduced signal digitization level DSL.

FIG. 2 is a characteristic diagram showing a reproduced signal digitization level DSL-to-jitter level JTR characteristic, wherein the horizontal axis represents the reproduced signal digitization level DSL and the vertical axis represents the output JTR of the jitter detection means 108.

In FIG. 24, when the digitization level DSL is set to level A, the clock TSJ produced by the synchronization means 107 becomes a spike-like clock as shown beside the label "For level A" in the lower portion of the figure. Then, DSL=level A holds in the characteristic diagram of FIG. 2. When the digitization level DSL is set to level B of FIG. 23, the clock TSJ produced by the synchronization means 107 becomes a pulse-like clock as shown beside the label "For level B" in the lower portion of the figure which has a time width TAB in proportion to the difference between levels A and B. Then, DSL=level B holds in the characteristic diagram of FIG. 2, and the jitter JTR is increased from that for level A. Similarly, when the digitization level DSL is set to level C of FIG. 24, the clock TSJ produced by the synchronization means 107 becomes a pulse-like clock as shown beside the label "For level C" in the lower portion of the figure which has a time width in proportion to the difference between levels A and C. Then, DSL=level C holds in the characteristic diagram of FIG. 2, and the level of jitter is increased from that for level A as in the case of level B. Thus, the level of jitter increases/decreases depending upon changes in the reproduced signal digitization level DSL.

There is an apparatus for adaptively setting the reproduced signal digitization level using as a reference the aperture ratio of the eye pattern of the reproduced signal for the purpose of optimizing the reproduced signal digitization level of such a digital data reproduction apparatus. This apparatus determines the level using a ROM table which has been previously set according to the aperture ratio of the eye pattern of the reproduced signal, and performs a digitization operation on the reproduced signal using the determined level (Japanese Laid-Open Patent Publication No. 5-6619, etc.).

However, the conventional digital data reproduction apparatuses have the following problems:

(1) The reproduced signal digitization level cannot be corrected until a signal is actually reproduced;

(2) The reproduced signal digitization level may not be adjusted so as to minimize the jitter which may cause an error in reading the reproduced signal;

(3) The jitter detection sensitivity in detecting a jitter component contained in a reproduced signal varies among various circuits; and (4) The individual difference becomes large among circuits for setting the cut-off frequency for waveform equalization of the reproduced signal.

The present invention has been made to solve the above-described problems and has an objective of providing a digital data reproduction apparatus and a method for correcting a reproduced signal digitization level in which the quality of the reproduced signal from the recording medium is kept high while ensuring the reproduction stability.

DISCLOSURE OF THE INVENTION

A digital data reproduction apparatus of the present invention comprises: reproduced signal digitization means for digitizing a reproduced signal; synchronization means for producing a clock whose phase is synchronized with a leading edge and a trailing edge of the digitized signal produced by the reproduced signal digitization means; and jitter detection means for integrating and thereby converting absolute values of phase errors between the digitized signal and the clock to a voltage value, the apparatus further comprising digitization level correction means for correcting a reproduced signal digitization level so as to minimize a signal produced by the jitter detection means, thereby achieving the above-described object.

The digital data reproduction apparatus may further comprise: pseudo reproduced signal production means for producing a pseudo reproduced signal; and a switch for switching a signal to be sent to the reproduced signal digitization means by selecting one of the signal produced by the pseudo reproduced signal production means and a normal reproduced signal.

A method for correcting a reproduced signal digitization level of the present invention comprises the steps of: obtaining a first proportional function within a positive region and a second proportional function within a negative region from sets of a plurality of digitization levels and jitter levels corresponding to the plurality of digitization levels within the positive region and the negative region, wherein the positive region is defined as a region of a level higher than a reference value of the reproduced signal digitization level, and the negative region is defined as a region of a level lower than the reference value; and computing a digitization level at a crossing point between the first proportional function and the second proportional function for correction of a digitization level of a reproduced digital data signal, thereby achieving the above-described object.

Another digital data reproduction apparatus of the present invention comprises: a detector for detecting digital data from a recording medium on which digital data is recorded; error signal production means for processing a signal from the detector so as to produce an error signal required for a control operation; control means for controlling the detector using the error signal; waveform equalization means for equalizing the signal from the detector; reproduced signal digitization means for converting a signal from the waveform equalization means to a digitized signal; synchronization means for producing a clock whose phase is synchronized with a leading edge and a trailing edge of the digitized signal which has been converted by the reproduced signal digitization means; and jitter detection means for integrating and thereby converting absolute values of phase errors between the digitized signal and the clock to a voltage value, wherein: the digital data reproduction apparatus further comprises correction means for correcting a detection sensitivity of the jitter detection means; and the correction means comprises: digitization level correction means for correcting a reproduced signal digitization level so as to minimize a signal produced by the jitter detection means; and sensitivity correction means for correcting the detection sensitivity of the jitter detection means using a signal from the digitization level correction means, thereby achieving the above-described object.

A still another digital data reproduction apparatus of the present invention comprises: a detector for detecting digital data from a recording medium on which digital data is recorded; error signal production means for processing a signal from the detector so as to produce an error signal required for a control operation; control means for controlling the detector using the error signal; waveform equalization means for equalizing the signal from the detector; reproduced signal digitization means for converting a signal from the waveform equalization means to a digitized signal; synchronization means for producing a clock whose phase is synchronized with a leading edge and a trailing edge of the digitized signal which has been converted by the reproduced signal digitization means; and jitter detection means for integrating and thereby converting absolute values of phase errors between the digitized signal and the clock to a voltage value, wherein: the digital data reproduction apparatus further comprises: digitization level correction means for correcting a reproduced signal digitization level so as to minimize a signal produced by the jitter detection means; and waveform equalization correction means for correcting waveform equalization coefficients of the waveform equalization means using a signal from the digitization level correction means, thereby achieving the above-described object.

The digital data reproduction apparatus may further comprise: pseudo reproduced signal production means for producing a pseudo reproduced signal; and a switch for switching a signal to be sent to the reproduced signal digitization means by selecting one of the signal produced by the pseudo reproduced signal production means and a normal reproduced signal equalized by the waveform equalization means.

Another method for correcting a reproduced signal digitization level of the present invention comprises: a first step of obtaining a first jitter level and a second jitter level respectively corresponding to a first digitization level within a positive region and a second digitization level within a negative region, wherein the positive region is defined as a region of a level higher than a reference value of the reproduced signal digitization level, and the negative region is defined as a region of a level lower than the reference value; a second step of obtaining a first digitization level and a second digitization level at which the first jitter level and the second jitter level are equal to each other; and a third step of correcting the reproduced signal digitization level based on an optimal digitization level, the optimal digitization level being a median point between the first digitization level and the second digitization level.

The second step may comprise a fourth step of varying the reproduced signal digitization level in a stepped manner so as to search for a first digitization level and a second digitization level at which the jitter levels are equal to each other.

The second step may comprise a fourth step of searching for the first digitization level and the second digitization level while always keeping an interval between the first digitization level and the second digitization level to be a constant interval.

The second step may comprise a fourth step of searching for the first digitization level and the second digitization level while keeping an interval between the first digitization level and the second digitization level to be equal to or greater than a predetermined interval.

A still another method for correcting a reproduced signal digitization level of the present invention comprises the steps of: obtaining a proportional function within one of a positive region and a negative region from sets of a plurality of digitization levels and jitter levels corresponding to the plurality of digitization levels, wherein the positive region is defined as a region of a level higher than a reference value of the reproduced signal digitization level, and the negative region is defined as a region of a level lower than the reference value; and correcting the reproduced signal digitization level based on an optimal digitization level, the optimal digitization level being a median point between a first digitization level existing within the other one of the regions different from the region within which the proportional function is obtained and a second digitization level which is obtained by applying, to the proportional function, a jitter level which is equal to the jitter level corresponding to the first digitization level, thereby achieving the above-described object.

A still another method for correcting a reproduced signal digitization level of the present invention comprises: a first step of varying a digitization level in a stepped manner in each of a positive region and a negative region so as to obtain a first optimal digitization level and a second optimal digitization level at which a jitter level corresponding to the digitization level is minimized, wherein the positive region is defined as a region of a level higher than a reference value of the reproduced signal digitization level, and the negative region is defined as a region of a level lower than the reference value; and a second step of obtaining an optimal digitization level for an entire region from the first optimal digitization level and the second optimal digitization level so as to correct the reproduced signal digitization level, thereby achieving the above-described object.

The second step may comprise a third step of correcting the reproduced signal digitization level based on an optimal digitization level for the entire region, the optimal digitization level being a median point between the first optimal digitization level and the second optimal digitization level.

BRIEF DESCRIPTION OF THE DRAWINGS

FIG. 24 is a principle diagram showing a characteristic correlation between the reproduced signal digitization level and the jitter level.

BEST MODE FOR CARRYING OUT THE INVENTION

Various embodiments of the digital data reproduction apparatus and the method for correcting a reproduced signal digital level according to the present invention will now be described with reference to the drawings.

(Embodiment 1)

Figure 1:
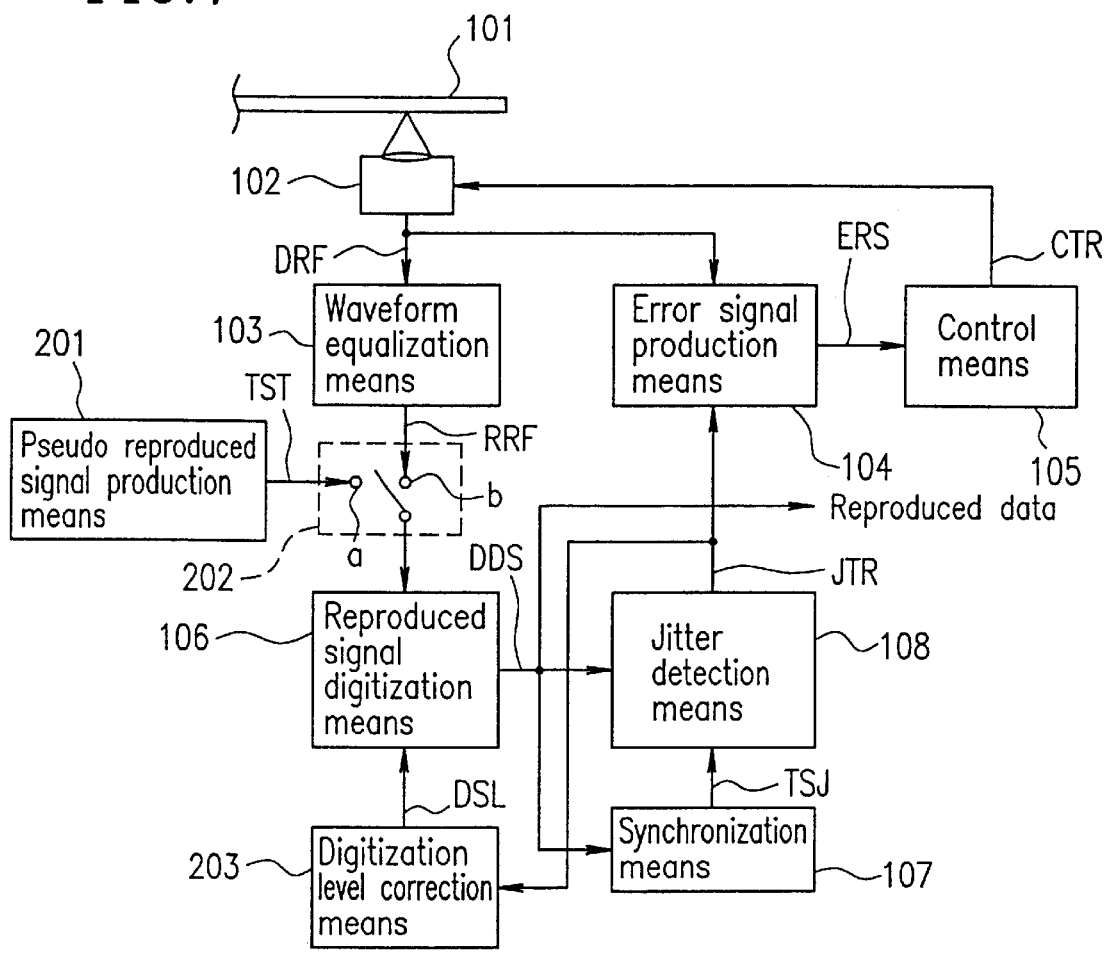
FIG. 1 is a block diagram illustrating a structure of a digital data reproduction apparatus according to Embodiment 1 of the present invention.

First, an embodiment of the digital data reproduction apparatus of the present invention will be described with reference to FIGS. 1 to 4. FIG. 1 is a block diagram showing the entire structure of the embodiment. In FIG. 1, the optical disk 101, the pick up 102, the waveform equalization means 103, the error signal production means 104, the control means 105, there produced signal digitization means 106, the synchronization means 107, and the jitter detection means 108 function similarly as those in the above-described conventional apparatus.

In addition to the elements of the conventional apparatus, there are also provided pseudo reproduced signal production means 201 for producing a pseudo reproduced signal TST, a switch 202 for switching between the pseudo reproduced signal TST and the normal reproduced signal RRF, and digitization level correction means 203 for adaptively correcting the reproduced signal digitization level so as to suppress the level of the jitter detection signal JTR. The pseudo reproduced signal TST may be a simple signal, e.g., a sinusoidal signal.

Figure 2:
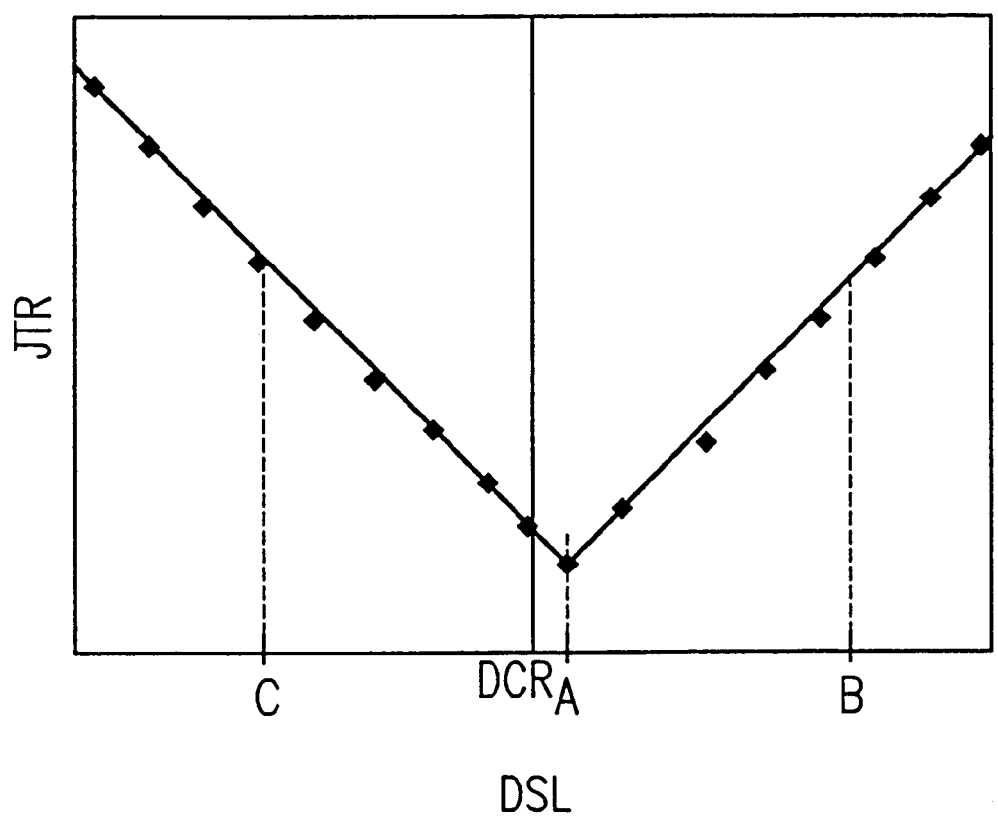
FIG. 2 is a characteristic diagram showing a reproduced signal digitization level-to-jitter level characteristic.

FIG. 2 is an exemplary characteristic graph showing a relationship between the reproduced signal digitization level DSL and the jitter detection signal JTR. The graph shows that the reproduced signal digitization level DSL and the jitter detection signal JTR are in linear symmetry about the jitter minimum point, and have a direct proportion relationship on either the positive side or the negative side. The graph also shows that the minimum jitter point may not always coincide with the median value DCR of the reproduced signal digitization level DSL. Accordingly, for ensuring a high-quality reproduced signal, it is effective to correct the reproduced signal digitization level DSL so as to minimize the jitter. A technique therefor will be described below in detail.

A method for correcting a reproduced signal digitization level using the digitization level correction means 203 will be described in detail. A first example of the digitization level correction method will be described with reference to FIGS. 3 and 4. First, the switch 202 of FIG. 1 is switched to contact the side "a" so that the signal TST from the pseudo reproduced signal production means 201 is sent to the reproduced signal digitization means 106. After the switch 202 has been switched to the side "a", the pseudo reproduced signal TST is produced by the pseudo reproduced signal production means 201.

Next, in a first step, a first reproduced signal digitization level DD1 is computed by subtracting an offset value D1 of the reproduced signal digitization level DSL, which has been predetermined by the digitization level correction means 203, from the median value DCR of the reproduced signal digitization level. The computed value DD1 is sent to the reproduced signal digitization means 106 as the reproduced signal digitization level DSL so as to produce a digitized signal DDS. A jitter component of the digitized signal DDS is detected by the jitter detection means 108 as the jitter detection signal JTR, which is then sent to and stored in the digitization level correction means 203 as DJ1 (S401).

Subsequently, a second reproduced signal digitization level DD2 is computed by, as in the case of D1, subtracting an offset value D2 of the reproduced signal digitization level DSL, which has been predetermined separately from D1, from the median value DCR of the reproduced signal digitization level. An operation similar to that performed on DD1 in the first step is performed on DD2 so as to obtain a jitter detection signal DJ2 corresponding to DD2 (S402). Based on the thus obtained two sets of data (DD1, DJ1) and (DD2, DJ2), a proportional function FUN is computed (S403). If the proportional coefficient (gradient) of the computed proportional function FUN is negative, the process proceeds to a second step and, if it is not negative, the above-described process is repeated again (S404). If the proportional coefficient (gradient) does not become negative after several repetitions (e.g., three repetitions) of the process, an error is returned and the process is terminated (S412).

In the second step, a first reproduced signal digitization level AD1 is computed by adding, as opposed to subtracting as in the first step, the offset value D1 of the reproduced signal digitization level DSL to the median value DCR of the reproduced signal digitization level. Thereafter, a process similar to that for DD1 in the first step is performed so as to obtain the corresponding jitter level AJ1, there by obtaining a set of data (AD1, AJ1) (S405). An operation similar to that for the offset value D1 is performed on D2 so as to obtain another set of data (AD2, AJ2) (S406).

Based on the thus obtained two sets of data (AD1, AJ1) and (AD2, AJ2), a proportional function FUP is computed (S407) as in the first step. In the case of FUP, the process proceeds to a third step if the proportional coefficient (gradient) is positive, as opposed to the case of FUN. If it is not positive, the process is repeated again (S408) as in the first step and, if the proportional coefficient (gradient) does not become positive after several repetitions (e.g., three repetitions) of the process, an error is returned and the process is terminated (S413).

Once the two proportional functions FUN and FUP are obtained, the process proceeds to the third step. In the third step, based on the two proportional functions FUN and FUP, the crossing point therebetween (Dbt, Jmn) is computed (S409). If the computed value Dbt is not between the predetermined upper and lower limit values DUL and DLL (S410), it can be determined that there is some defect in the circuit, in which case an error is returned and the process is terminated (S414). If the value Dbt is obtained as a value included in an appropriate range of the reproduced signal digitization level DSL (S410), the value Dbt is set as the optimal value of the reproduced signal digitization level (S411), and the process is terminated.

(Embodiment 2)

Figure 5:
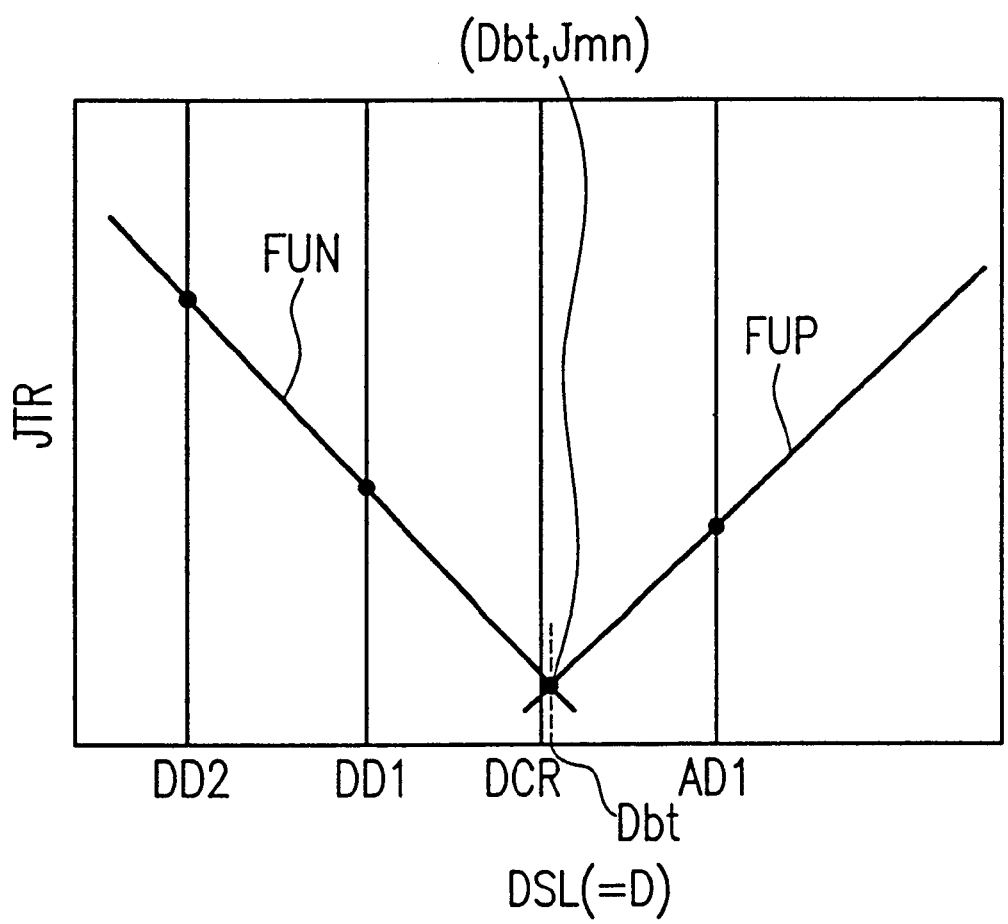
FIG. 5 is a principle diagram of a second method for computing a reproduced signal digitization level at which the jitter is minimized according to Embodiment 2 of the present invention.
Figure 6:
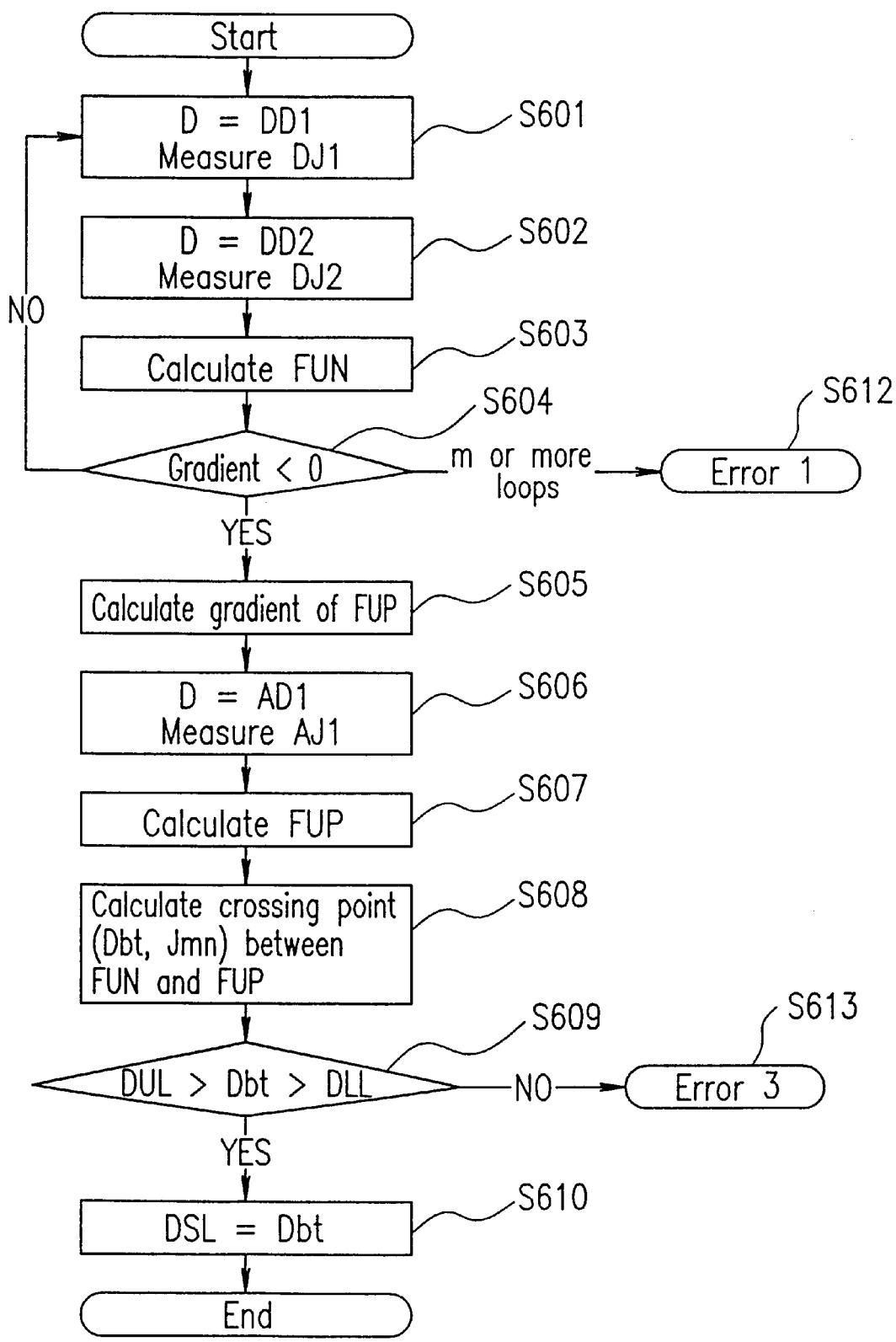
FIG. 6 is a flow chart illustrating a process flow of the second method.
Figure 7:
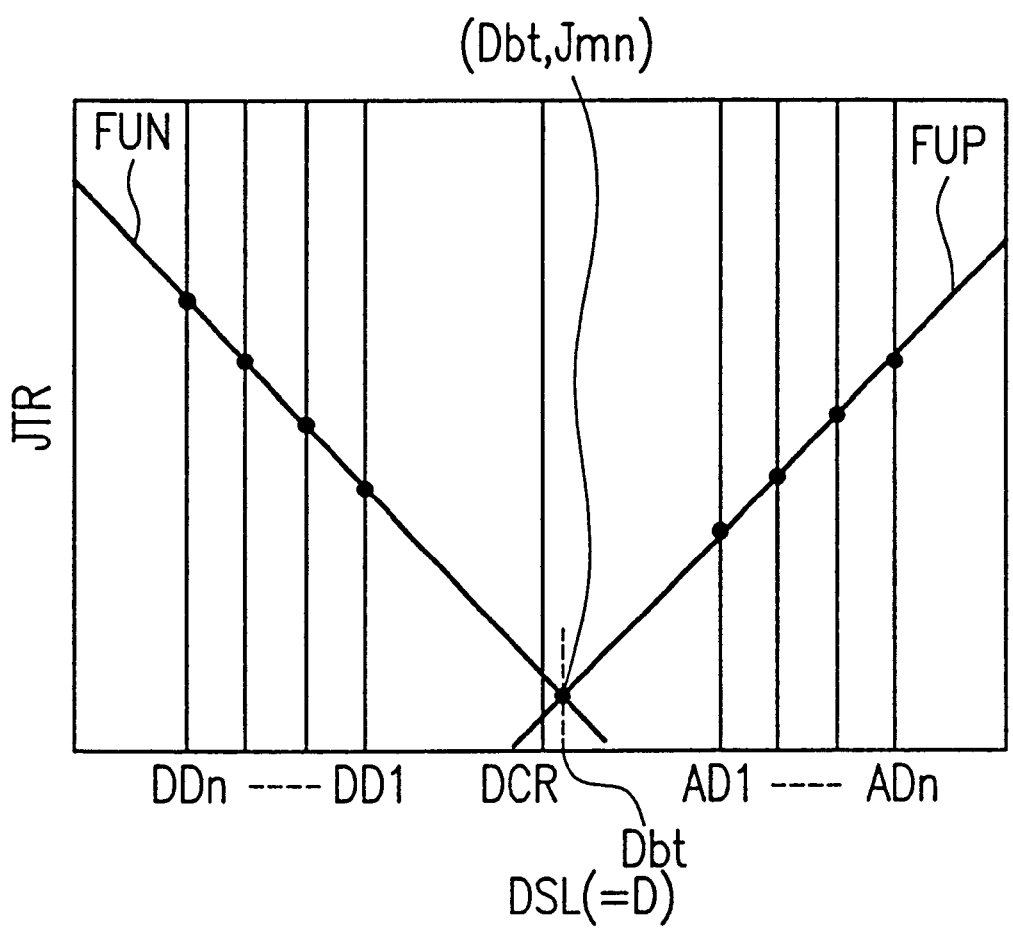
FIG. 7 is a principle diagram of a third method for computing a reproduced signal digitization level at which the jitter is minimized according to Embodiment 3 of the present invention.

Embodiment 2 of the digitization level correction method will be described with reference to FIGS. 5 and 6. As in Embodiment 1, the reproduced signal digitization levels DD1 and DD2 are obtained by subtracting the predetermined offset values D1 and D2, respectively, of the reproduced signal digitization level from the median value DCR of the reproduced signal digitization level, so as to obtain the corresponding jitter levels DJ1 and DJ2. Based on these sets of data, the proportional function FUN is computed. The process so far is substantially the same as that of Embodiment 1. The process in the second step is different from that of Embodiment 1.

In the second step, based on the proportional function FUN obtained in the first step, the proportional coefficient (gradient) of the proportional function FUP is first obtained (S605). When the proportional function FUN is expressed as y=ax+b, the proportional function FUP which is in linear symmetry with FUN can be expressed as y=−ax+b'. Then, AD1 is obtained by adding the offset value D1 of the reproduced signal digitization level to the median value DCR so as to obtain the jitter level AJ1 corresponding to AD1 (S606). The proportional function FUP is obtained based on the set of data (AD1, AJ1) and the proportional coefficient (gradient) of the proportional function FUP (S607).

Thereafter, based on the two proportional functions FUN and FUP, the crossing point therebetween (Dbt, Jmn) is obtained as in Embodiment 1 (S608), and Dbt is evaluated (S609) and is set as the optimal digitization level (S610) if it is a value included in an appropriate range.

(Embodiment 3)

Figure 3:
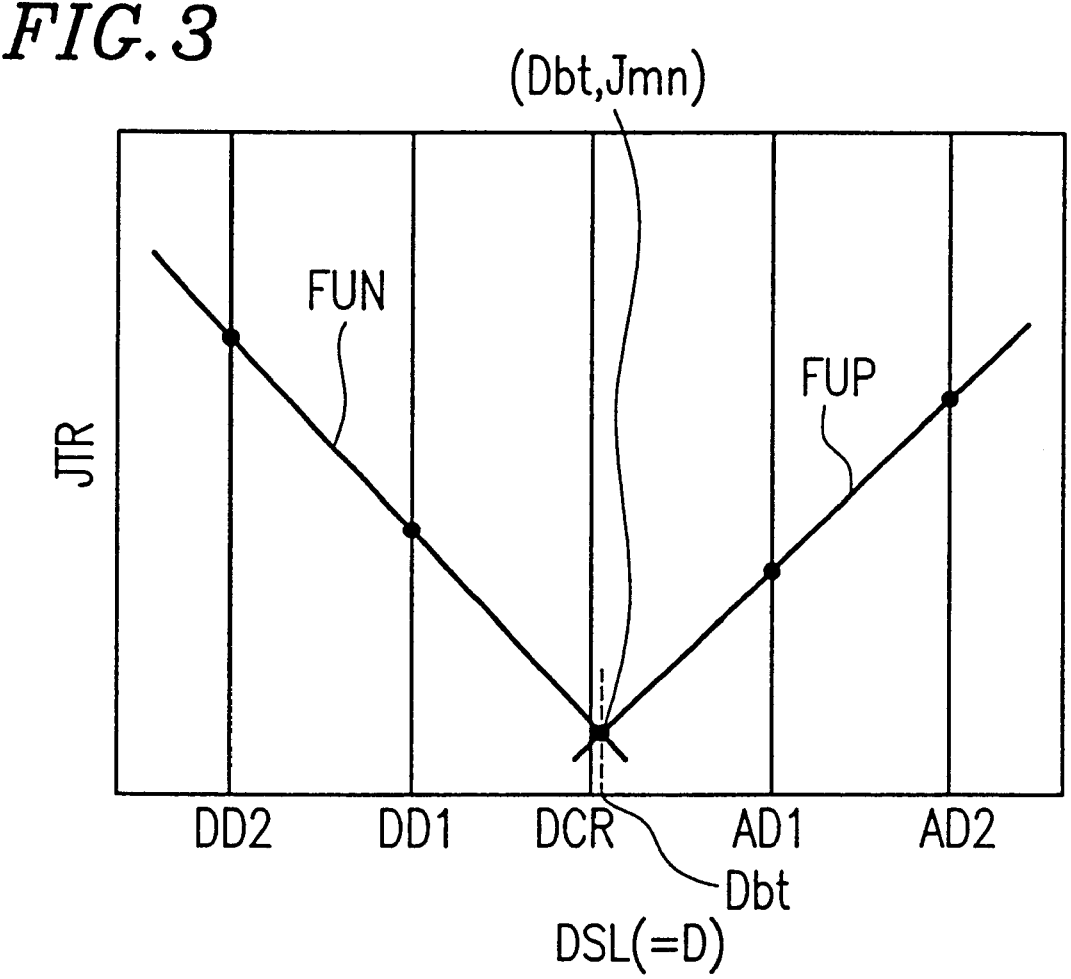
FIG. 3 is a principle diagram of a first method for computing a reproduced signal digitization level at which the jitter is minimized according to Embodiment 1 of the present invention.
Figure 4:
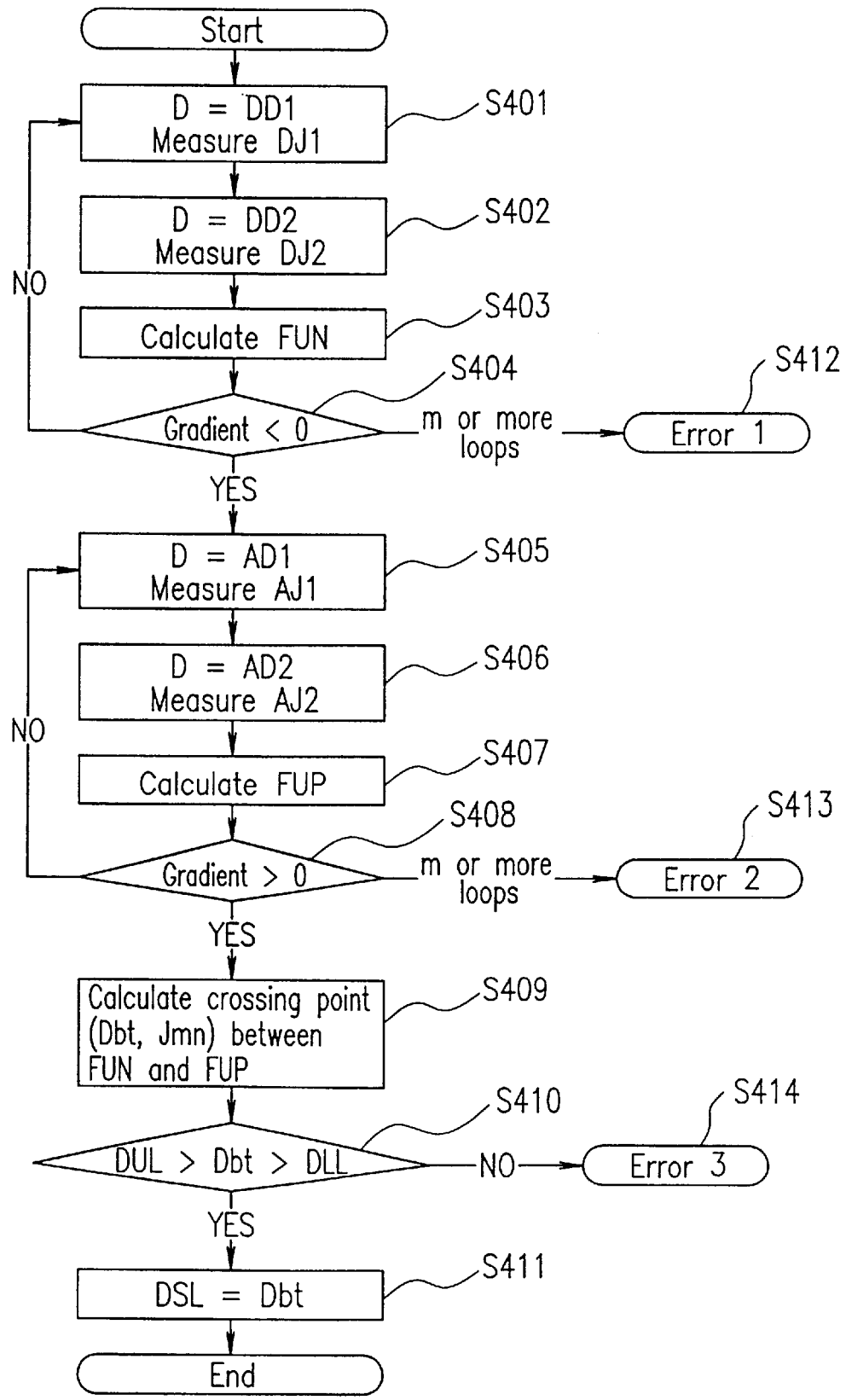
FIG. 4 is a flow chart illustrating a process flow of the first method.
Figure 8:
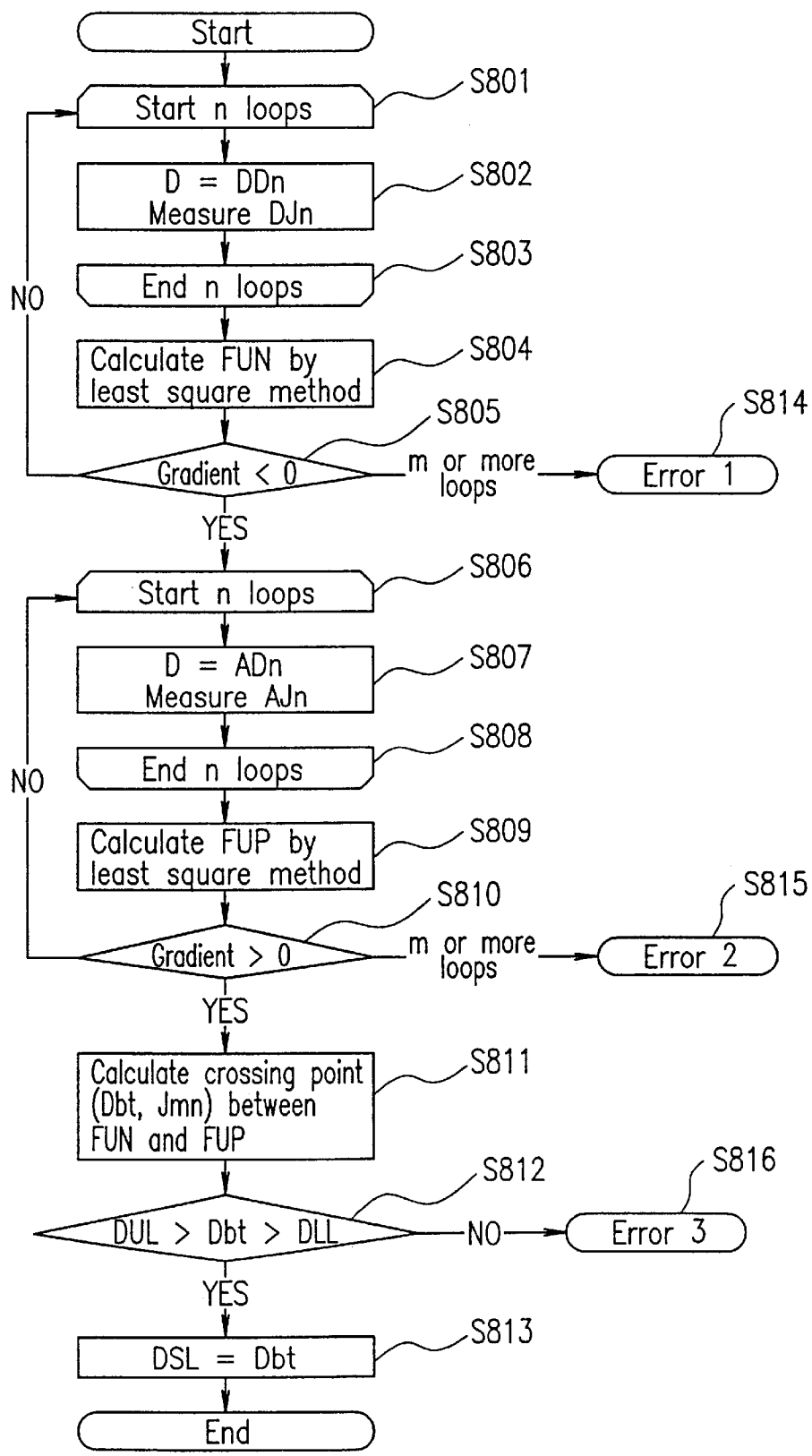
FIG. 8 is a flow chart illustrating a process flow of the third method.

Embodiment 3 of the digitization level correction method will be described with reference to FIGS. 3 and 8. The sets of data (DD1, DJ1) and (DD2, DJ2) are obtained as in Embodiments 1 and 2. According to Embodiment 3, a number N of such data sets are obtained, i.e., up to (AND, AJN) (S801, S802, S803). Using the obtained N sets of data, the proportional function FUN is computed by a least square method (S804).

Data sets (AD1, AJ1), (AD2, AJ2), ..., (ANN, AJN) are obtained in a manner similar to that for obtaining the proportional function FUN, and the proportional function FUP is computed by a least square method (S806, S807, S808, S809).

Thereafter, a process similar to that of Embodiments 1 and 2 is performed so as to obtain the crossing point (Dbt, Jmn) between the two proportional functions FUN and FUP (S810, S811), and Dbt is evaluated (S812) and is set as the optimal digitization level (S813) if it is a value included in an appropriate range.

(Embodiment 4)

Embodiment 4 of the digitization level correction method will be described with reference to FIGS. 9, 10, 11 and 12. A switching operation is performed so that the signal TST form the pseudo reproduced signal production means 201 of FIG. 1 is sent to the reproduced signal digitization means 106, after which a process similar to that of Embodiments 1–3 is performed until the pseudo reproduced signal TST is produced by the pseudo reproduced signal production means 201. The process after the first step is different from those of Embodiments 1–3.

In the first step, a first reproduced signal digitization level DD(0) (=D0−ΔD) is first computed by subtracting an offset value ΔD (>0) of the reproduced signal digitization level DSL, which has been predetermined by the digitization level correction means 203, from the median value DCR (=D0) of the reproduced signal digitization level. Using the computed value DD(0) as the digitization level DSL, the jitter detection signal JTR is detected as DJ(0) in a manner similar to those of Embodiments 1–3 (S1101, S1102). Subsequently, a second reproduced signal digitization level AD(0) (=D0+ΔD) is computed by adding the predetermined offset value ΔD of the reproduced signal digitization level DSL. In a manner similar to that for obtaining DJ(0), the jitter detection signal JTR corresponding to the second reproduced signal digitization level AD(0) is detected as AJ(0) (S1103).

Figure 9:
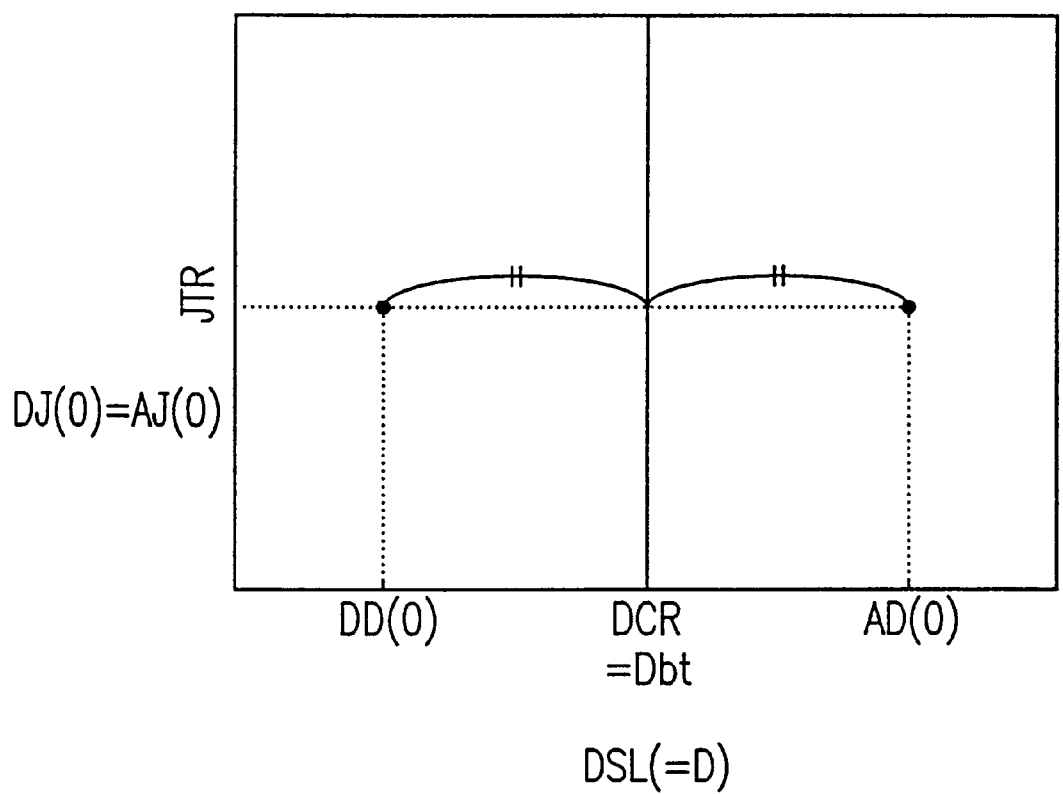
FIG. 9 is a first principle diagram of a fourth method for computing a reproduced signal digitization level at which the jitter is minimized according to Embodiment 4 of the present invention.

In the second step, an absolute difference |DJ(0)−AJ(0)| between the two jitter detection signals DJ(0) and AJ(0) obtained in the first step (S1105, S1106, S1107) is obtained. If the absolute difference is smaller than a predetermined reference value FIN, i.e., if |DJ(0)−AJ(0)|<FIN holds (as shown in FIG. 9) (S1108), then, Dbt is assigned to the median value between the two digitization levels DD(0) and AD(0) which give DJ(0) and AJ(0), respectively (S1113), and Dbt is evaluated (S1115). As a result of the evaluation, if Dbt is a value which is included in an appropriate range, Dbt is set as the optimal digitization level (S1116). When it is not included in the appropriate range, an error is issued (S1118). If |DJ(0)−AJ(0)|<FIN does not hold, the process proceeds to the third step (S1108).

Figure 10:
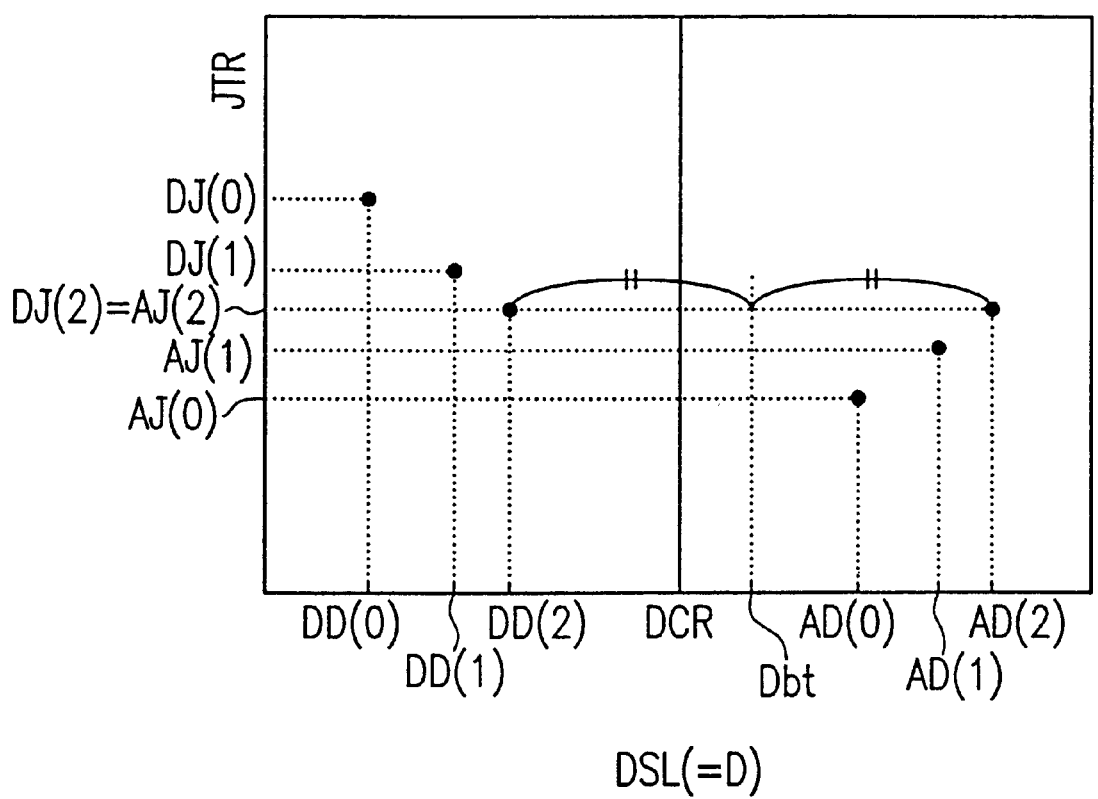
FIG. 10 is a second principle diagram of the fourth method for computing a reproduced signal digitization level at which the jitter is minimized according to Embodiment 4 of the present invention.
Figure 11:
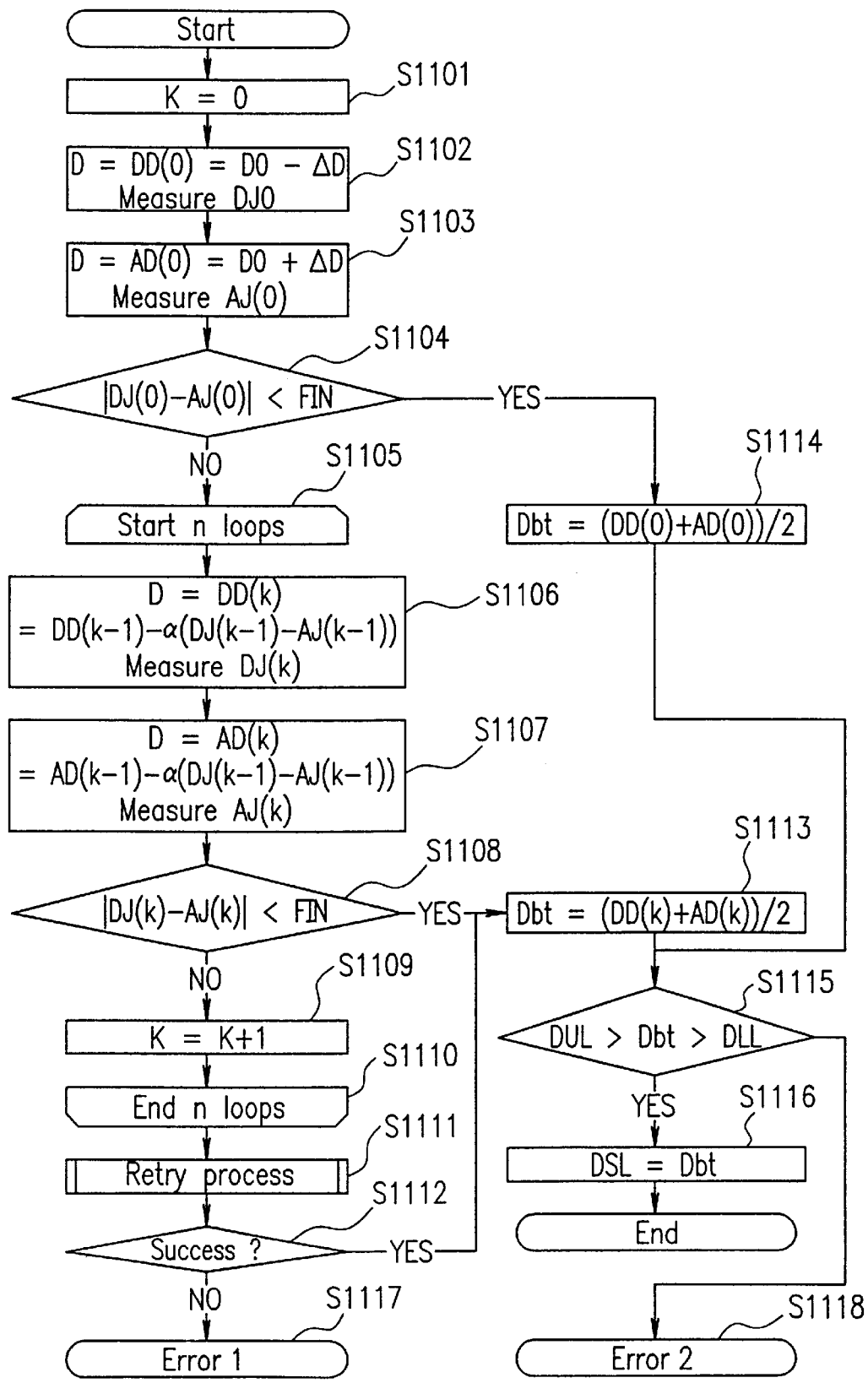
FIG. 11 is a flow chart illustrating a process flow of the fourth method.

In the third step, the reproduced signal digitization level DSL is successively updated as illustrated in FIG. 10. The digitization levels corresponding to DD(0) and AD(0), respectively, from the first step are updated in accordance with the following arithmetic expressions:

$$DD(k)=DD(k-1)+\alpha(DJ(k-1)-AJ(k-1)) \quad \text{Expression (1); and}$$

$$AD(k)=AD(k-1)+\alpha(DJ(k-1)-AJ(k-1)).$$

Thus, while the update operation is successively performed in accordance with the expressions (S1106, S1107), the two digitization levels DD(k) and AD(k) which satisfy the final conditional expression |DJ(k)−AJ(k)|<FIN are searched for (S1105–S1110). Herein, the update operation is performed so that the interval between DD(k) and AD(k) always has a constant value. While α in the above-described conditional expression for DD(k) and AD (k) is a constant, it may alternatively be replaced with a jitter level function, a digitization level function, or a function of k.

Once the two digitization levels DD(k) and AD(k) which give DJ(k) and AD(k), respectively, which satisfy the conditional expression are obtained, Dbt is assigned to the median value therebetween (i.e., (DD(k)+AD(k))/2)) (S1113). Until Dbt is obtained, the two digitization levels DD(k) and AD(k) are updated in a predetermined limited number n of loops, and the process of the third step is repeated (S1105–S1110). FIG. 10 shows an example where Dbt is obtained with n=2. If Dbt is not obtained even after the limit number n of loops, the process proceeds to the fourth step. If Dbt is obtained during the looping operation, it is evaluated as in the second step whether Dbt is a value included in an appropriate range of the digitization level (S1115). As a result of the evaluation, if Dbt is appropriate, Dbt is set as the optimal digitization level (S1116). When it is not appropriate, an error is issued (S1118).

In the fourth step, a predetermined value β is added to the digitization level search reference D0, which was the digitization level median value DCR in the first step, so as to obtain (D0+β) as a new digitization level search reference D0. The process proceeds to the first step again for a retry process based on the new digitization level search reference D0 (S111). The predetermined value β may be either a positive or negative value, or alternatively both positive and negative values may be used therefor. Moreover, the value β may be appropriately updated in a stepped manner or in accordance with a reference expression. The re-search operation while varying the value of the digitization level search reference D0 is effective in the case where the optimal digitization level is significantly offset from the digitization level reference value.

Figure 12:
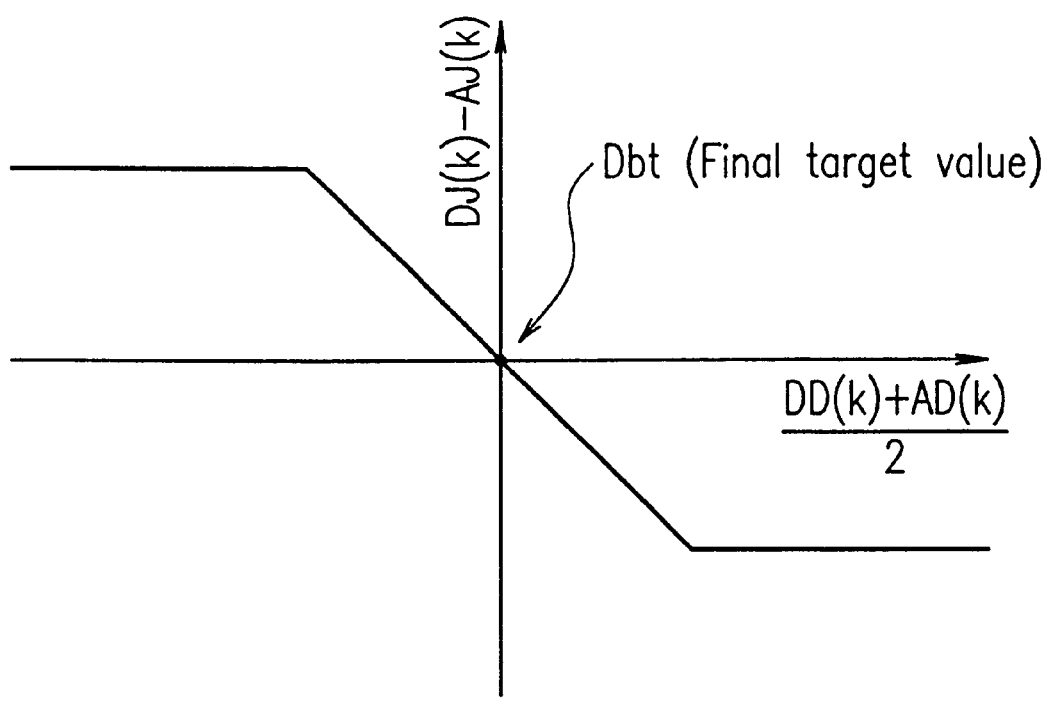
FIG. 12 is a diagram showing a characteristic between the median point between digitization level search points DD(k) and AD(k) and the difference DJ(k)–AJ(k) between the jitter levels at the respective search points according to Embodiment 4 of the present invention.

As can be seen from Expression (1), as DJ(k)−AJ(k) is larger, the step used in the search may be set to a proportionally larger value. Conversely, as DJ(k)−AJ(k) is smaller, the step used in the search may be set to a proportionally smaller value. FIG. 12 shows a relationship between the median point (DD(k)+AD(k))/2 between the search points DD(k) and AD(k) and the difference DJ(k)−AJ(k) between the jitter detection signal values at the respective search points. As can be seen from the figure, the closer to the final target value Dbt, the step used in the search becomes finer, thereby allowing for a high-precision search.

(Embodiment 5)

Figure 13:
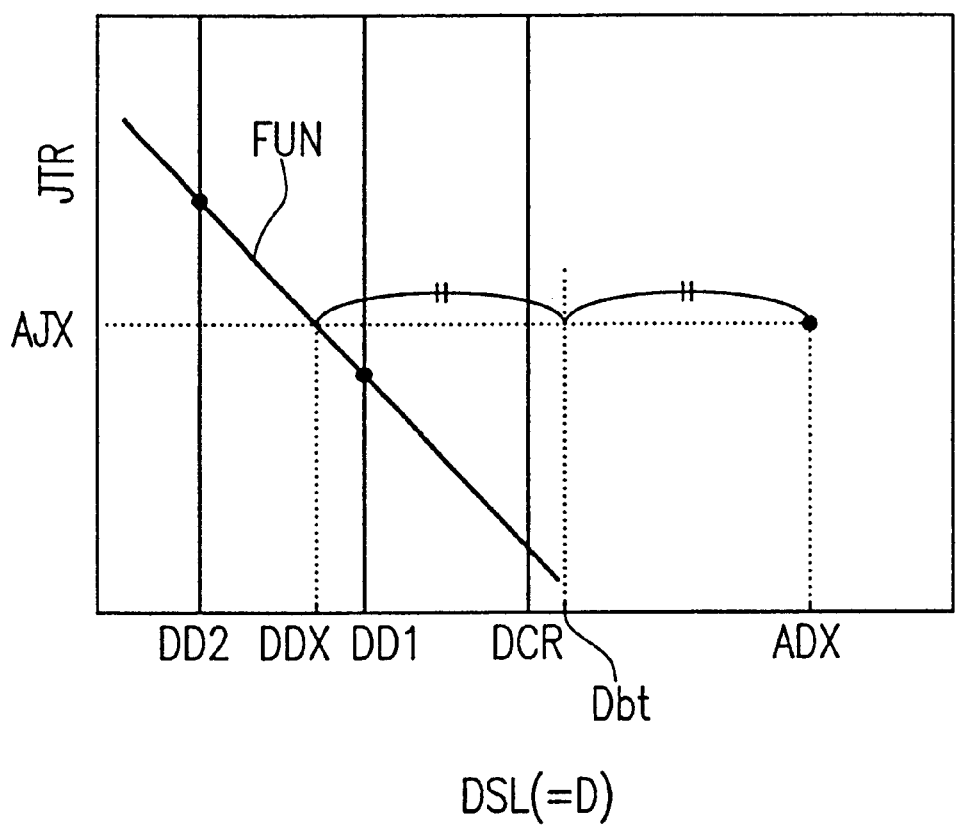
FIG. 13 is a principle diagram of a fifth method for computing a reproduced signal digitization level at which the jitter is minimized according to Embodiment 5 of the present invention.
Figure 14:
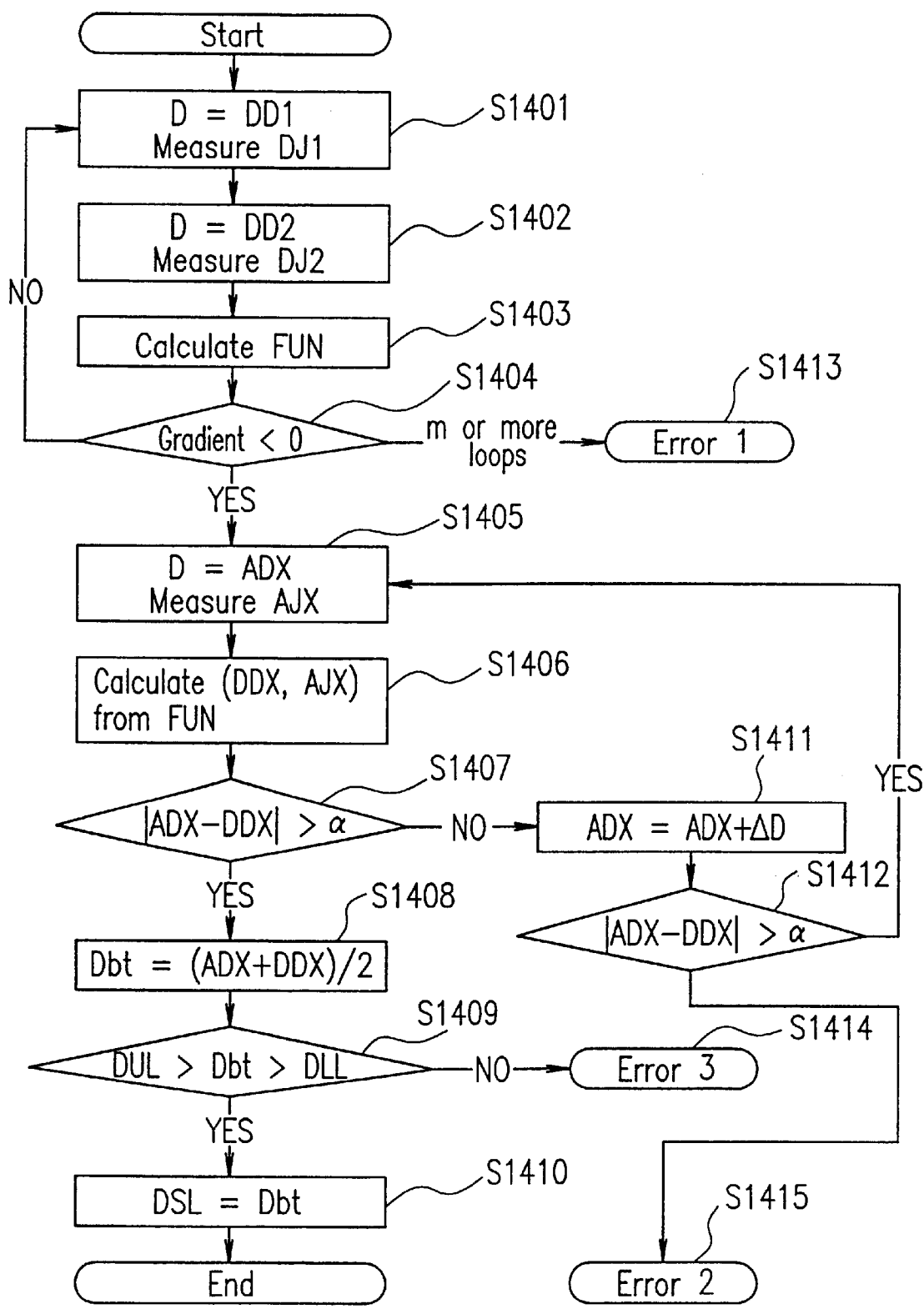
FIG. 14 is a flow chart illustrating a process flow of the fifth method.

Embodiment 5 of the digitization level correction method will be described with reference to FIGS. 13 and 14. As in Embodiment 1, the reproduced signal digitization levels DD1 and DD2 are obtained by subtracting the predetermined offset values D1 and D2, respectively, of the reproduced signal digitization level from the median value DCR of the reproduced signal digitization level, and the corresponding jitter levels DJ1 and DJ2 are obtained (S1401, S1402). The proportional function FUN is computed based on these sets of data (S1403). The process so far is substantially the same as that of Embodiment 1. The processes in and after the second step are different from those of Embodiment 1.

In the second step, a reproduced signal digitization level ADX (a reproduced signal digitization level within a region which is different from the region within which the proportional function FUN is obtained) is first obtained by adding a predetermined offset value DX of the reproduced signal digitization level to the median value DCR of the reproduced signal digitization level. Subsequently, a jitter detection level AJX corresponding to the digitization level ADX is obtained (S1405), and the jitter detection level for the proportional function FUN is assigned to the obtained value AJX.

A digitization level is obtained as DDX by solving the equation which is obtained by the assignment of AJX (S1406). If the absolute difference |ADX−DDX| between ADX and DDX is smaller than the predetermined value α (S1407), a new value of ADX is obtained by adding the predetermined offset value ΔD to ADX (S1411), and the absolute difference |ADX−DDX| between ADX and DDX is again compared with α (S1412). If the condition |ADX−DDX|>α holds, the process of the second step is performed again from the beginning thereof (S1405). If the condition does not hold, an error is returned, and the process is terminated (S1415). If the absolute difference |ADX−DDX| between ADX and DDX is equal to or greater than the predetermined value α (S1407), the median point between ADX and DDX (i.e., (ADX+DDX)/2) is obtained and set as the optimal digitization level Dbt (S1408). The evaluation of Dbt is substantially the same as that of Embodiment 1 (S1409, S1410, S1414).

In the above example, a proportional function is obtained within a region of a level lower than the reference value DCR of the reproduced signal digitization level DSL (this region is referred to as the negative region), while ADX is obtained within a region of a level higher than the reference value DCR of the reproduced signal digitization level DSL (this region is referred to as the positive region). However, the regions may of course be switched around.

(Embodiment 6)

Figure 15:
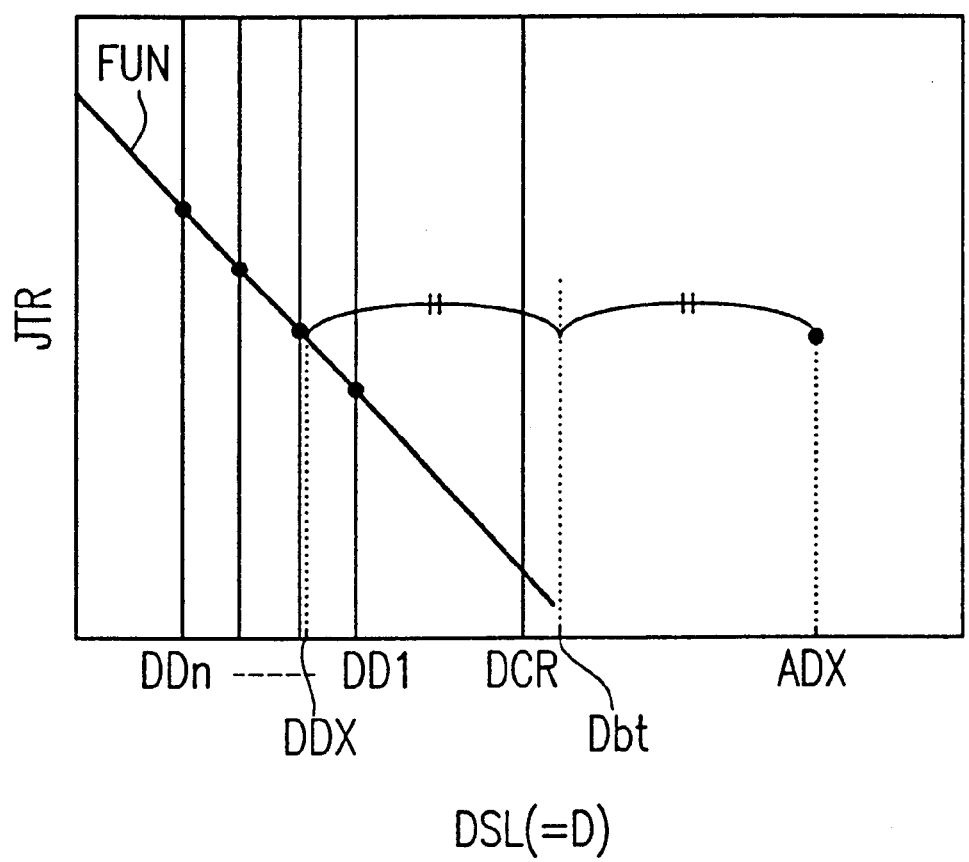
FIG. 15 is a principle diagram of a sixth method for computing a reproduced signal digitization level at which the jitter is minimized according to Embodiment 6 of the present invention.
Figure 16:
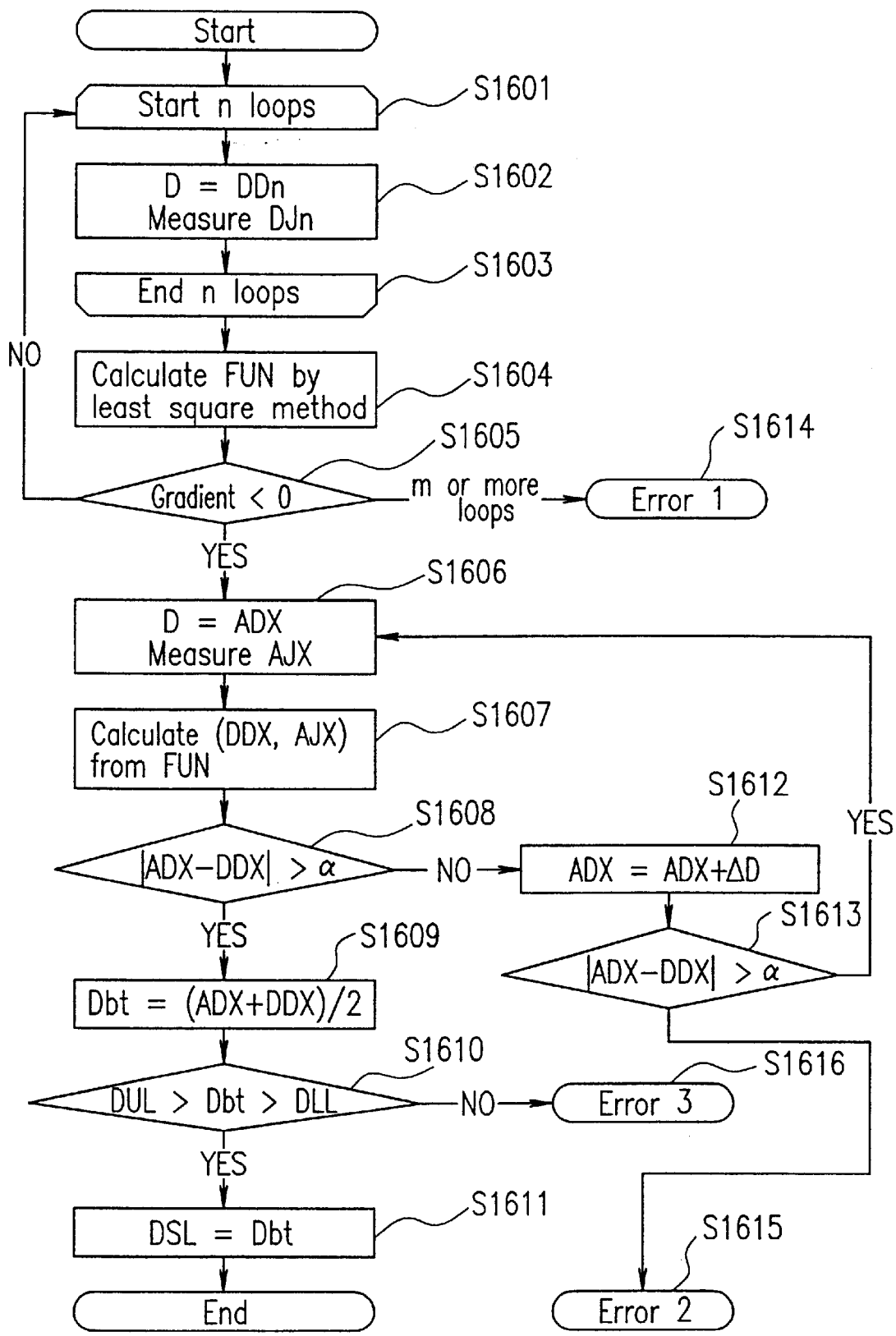
FIG. 16 is a flow chart illustrating a process flow of the sixth method.

Embodiment 6 of the digitization level correction method will be described with reference to FIGS. 15 and 16. As in Embodiment 3, N sets of data (DD1, DJ), (DD2, DJ2), ... , (AND, AJN) are obtained (S1601, S1602, S1603). Using the obtained N sets of data, the proportional function FUN in the negative region is computed by a least square method (S1604). The processes in and after the second step are different from those of Embodiment 3.

In the second step, the reproduced signal digitization level ADX (a reproduced signal digitization level within a region which is different from the region within which the proportional function FUN is obtained) is first obtained by adding the predetermined offset value DX of the reproduced signal digitization level to the median value DCR of the reproduced signal digitization level. Subsequently, the jitter detection level AJX corresponding to the digitization level ADX is obtained (S1606), and the jitter detection level for the proportional function FUN is assigned to the obtained value AJX.

A digitization level is obtained as DDX by solving the equation which is obtained by the assignment of AJX (S1607). If the absolute difference |ADX−DDX| between ADX and DDX is smaller than the predetermined value α (S1608), a new value of ADX is obtained by adding the predetermined offset value ΔD to ADX (S1612), and the absolute difference |ADX−DDX| between ADX and DDX is again compared with α (S1613). If the condition |ADX−DDX|>α holds, the process of the second step is performed again from the beginning thereof (S1606). If the condition does not hold, an error is returned, and the process is terminated (S1615). If the absolute difference |ADX−DDX| between ADX and DDX is equal to or greater than the predetermined value a (S1608), the median point between ADX and DDX (i.e., (ADX+DDX)/2) is obtained and set as the optimal digitization level Dbt (S1609). The evaluation of Dbt is substantially the same as that of Embodiment 1 (S1610, S1611, S1616).

As in Embodiment 5 of the digitization level correction method, an example has been described above where the proportional function is obtained within the negative region while ADX is obtained within the positive region. However, the regions may of course be switched around.

(Embodiment 7)

Figure 17:
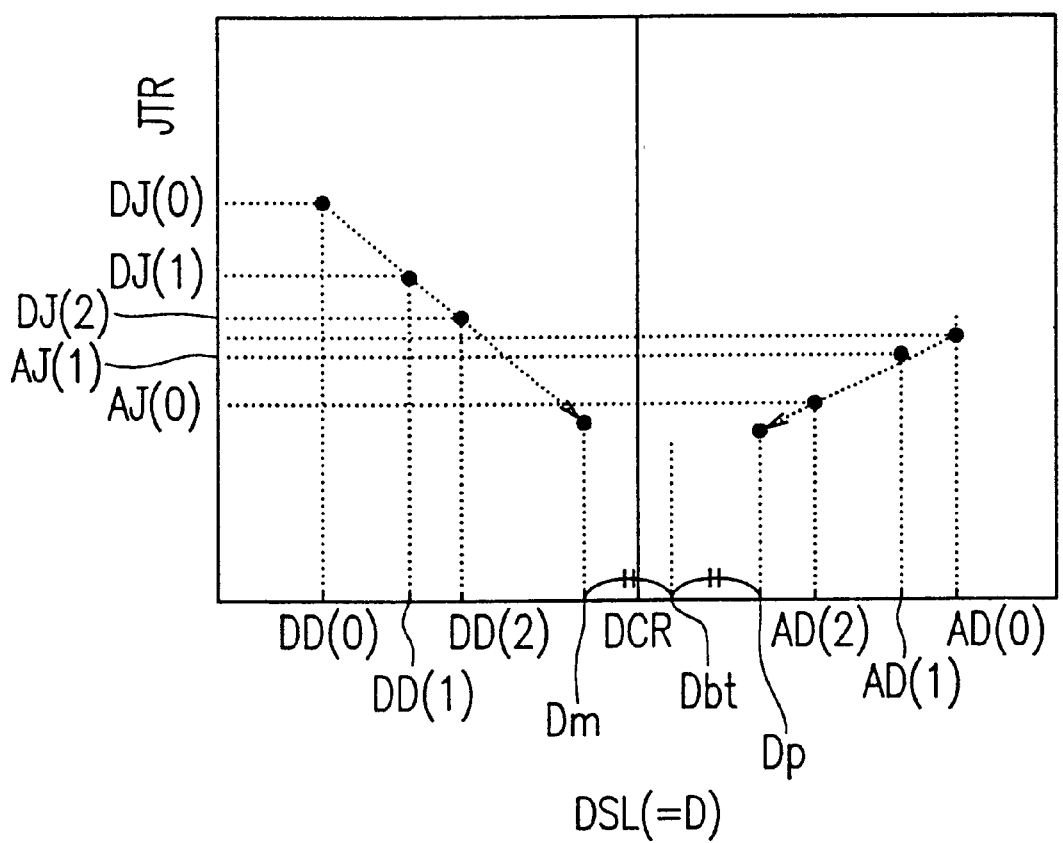
FIG. 17 is a principle diagram of a seventh method for computing a reproduced signal digitization level at which the jitter is minimized according to Embodiment 7 of the present invention.
Figure 18:
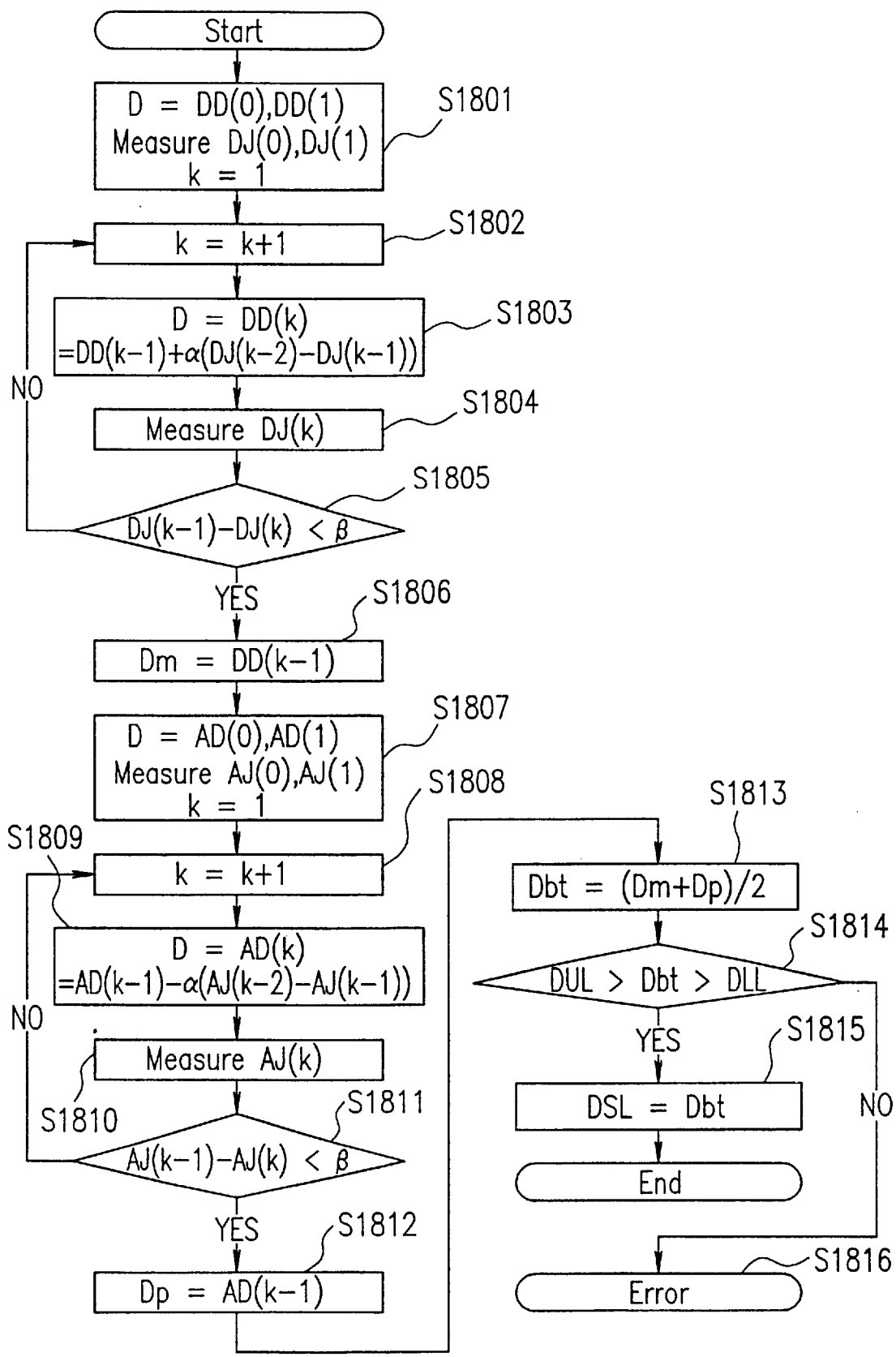
FIG. 18 is a flow chart illustrating a process flow of the seventh method.
Figure 19:
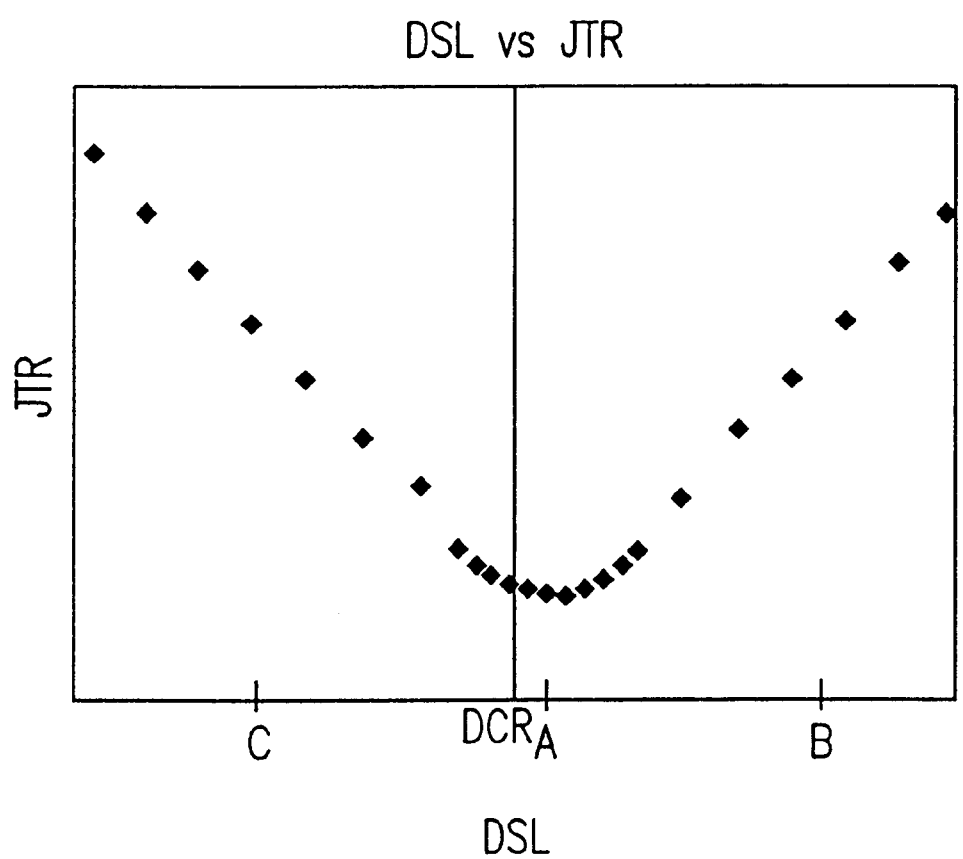
FIG. 19 is a characteristic diagram showing a reproduced signal digitization level DSL-to-jitter level JTR characteristic according to Embodiment 7 of the present invention.

The seventh example of the digitization level correction method will be described with reference to FIGS. 17, 18 and 19. FIG. 17 illustrates a principle diagram of the seventh method for computing a reproduced signal digitization level at which the jitter is minimized according to Embodiment 1 of the present invention.

In the first step, the jitter detection levels DJ(0) and DJ(1) for the predetermined reproduced signal digitization levels DD(0) and DD(1), respectively (DD(0)<DD(1); both are within the negative region), are first obtained (S1801). The process proceeds to the second step based on the sets of data (DD(0), DJ(0)) and (DD(1), DJ(1)) of the two reproduced signal digitization levels and the jitter detection signal levels for these digitization levels.

In the second step, a new reproduced signal digitization level DD(k) is obtained based on the sets of data (DD(k−2), DJ(k−2)) and (DD(k−1), DJ(k−1)) of the two reproduced signal digitization levels and the jitter detection signal levels for these digitization levels in accordance with the following expression (S1802, S1803):

$$DD(k)=DD(k-1)+\alpha(DJ(k-2)-DJ(k-1))$$

where $\alpha$ is a predetermined constant.

The jitter detection level DJ(k) corresponding to the value of DD(k) which has been obtained by this expression is obtained (S1804), and the difference DFD=DJ(k−1)−DJ(k) between the obtained values of DJ(k) and DJ(k−1) is computed. The second step is repeated until the absolute value of DFD, |DFD|, satisfies |DFD|<β (β is a predetermined constant) (S1805). The value of DD(k−1) when |DFD|<|β is satisfied is used as the optimal reproduced signal digitization level Dm within the negative region (S1806).

In the third step, a process similar to that of the first step is performed within the positive region. In particular, the jitter detection levels AJ(0) and AJ(1) for the predetermined reproduced signal digitization levels AD(0) and AD(1), respectively (AD(1)<AD(0); both are within the positive region), are obtained (S1807), and the process proceeds to the fourth step based on the sets of data (DD(0), DJ(1)) and (DD(1), DJ(1)) of the two reproduced signal digitization levels and the jitter detection levels for these digitization levels.

In the fourth step, a new reproduced signal digitization level AD(k) is obtained based on the sets of data (AD(k−2), AJ(k−2)) and (AD(k−1), AJ(k−1)) of the two reproduced signal digitization levels and the jitter detection signal levels for these digitization levels in accordance with the following expression (S1809):

$$AD(k)=AD(k-1)+\alpha(AJ(k-2)-AJ(k-1))$$

where $\alpha$ is a predetermined constant as in the second step.

The jitter detection level AJ(k) corresponding to the value of AD(k) which has been thus obtained is obtained (S1810), and the difference DFA=AJ(k−1)−AJ(k) between the obtained values of AJ(k) and AJ(k−1) is computed. The fourth step is repeated until the absolute value of DFA, |DFA|, satisfies |DFA|<β (β is a predetermined constant) (S1811). The value of AD(k−1) when |DFA|<β is satisfied is used as the optimal reproduced signal digitization level Dp within the positive region (S1812).

In the fifth step, the optimal reproduced signal digitization level Dbt for the entire region is computed and set in accordance with Dbt=(Dp+Dm)/2 based on the respective optimal reproduced signal digitization levels Dp and Dm within the positive and negative regions (S1813). Thereafter, the evaluation of Dbt is substantially the same as that of Embodiment 1 (S1814, S1815, S1816). The method of this embodiment is particularly effective in the case of a bottom-of-a-pan-like characteristic as shown in FIG. 19.

After correcting the digitization level by using the method as described above, the switch 202 is switched to contact the side "b" so that the reproduced signal RRF from the waveform equalization means 103 is sent to the reproduced signal digitization means 106, and a normal reproducing operation is initiated.

By performing the process as described above at power-on, it is possible, without actually reproducing the optical disk 101, to correct the reproduced signal digitization level to a level at which the jitter is minimized.

It is of course possible to correct the reproduced signal digitization level using a signal from the optical disk 101. In the case of reproducing a disk such as a CD on which non-compressed data is recorded at a normal speed, the above operation can be performed during the start-up operation following the loading of the disk. Alternatively, the correction operation can be performed during an intermittent operation in the case of a double-speed reproduction of a disk, or in the case of reproducing a disk such as DVD (Digital Versatile Disk) on which compressed data is recorded.

As described above, the digital data reproduction apparatus of Embodiment 1 includes the optical disk 101, the pick up 102, the waveform equalization means 103, the error signal production means 104, the control means 105, the reproduced signal digitization means 106, the synchronization means 107, and the jitter detection means 108. The pseudo reproduced signal production means 201 for producing a pseudo reproduced signal, the switch 202 for switching the signal sent to the reproduced signal digitization means 106 between a signal from the pseudo reproduced signal production means 201 and the signal obtained in a normal disk reproduction operation, and the digitization level correction means 203 for correcting the reproduced signal digitization level are additionally provided, so that the digitization level used in digitizing a reproduced signal can be corrected so that the jitter is minimized by applying one of the methods according to Embodiments 2–7.

(Embodiment 8)

Figure 20:
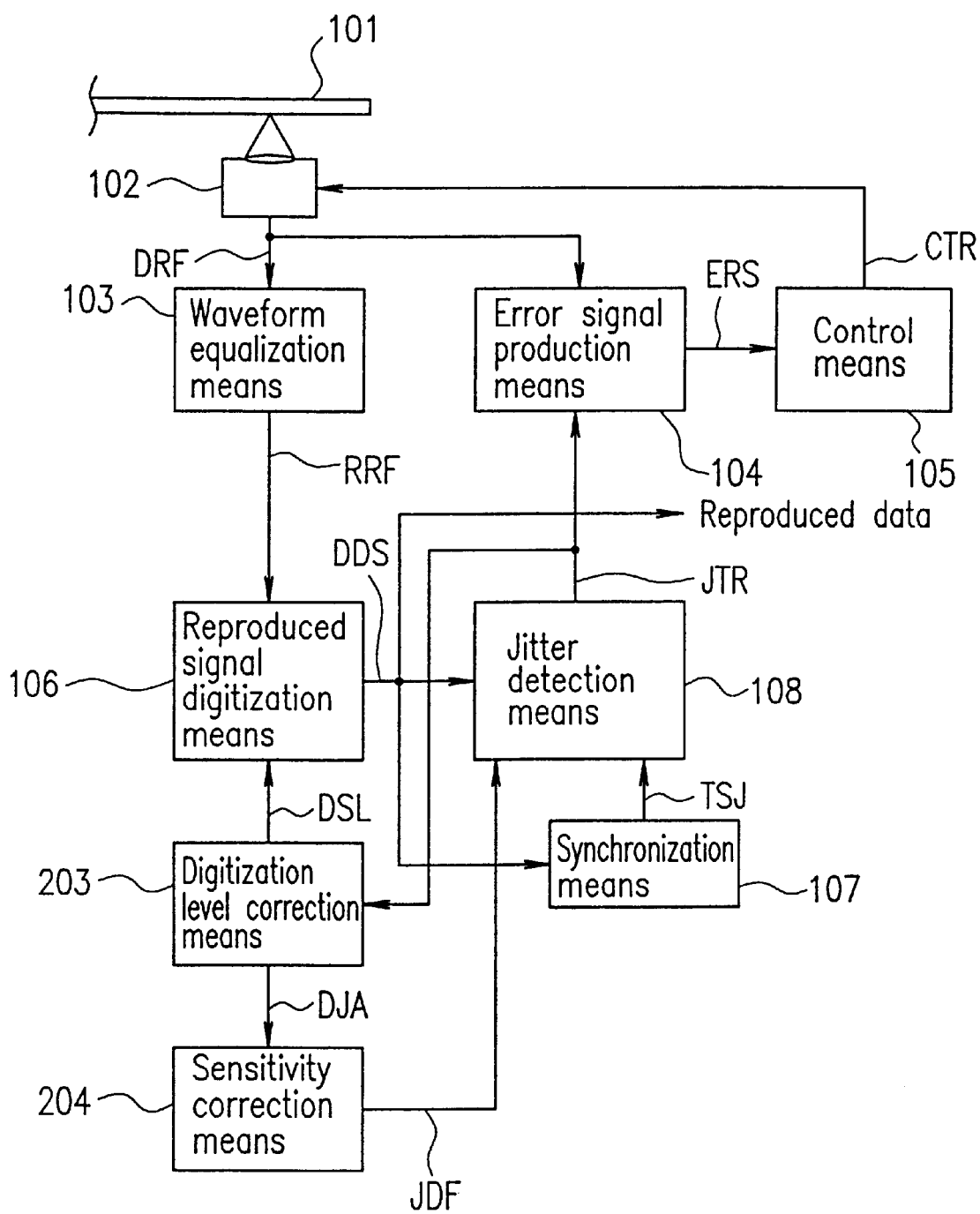
FIG. 20 is a block diagram illustrating a structure of a digital data reproduction apparatus according to Embodiment 8 of the present invention.

Next, a digital data reproduction apparatus of the present invention will be described with reference to a block diagram of FIG. 20 illustrating one embodiment thereof.

In FIG. 20, the optical disk 101, the pickup 102, the waveform equalization means 103, the error signal production means 104, the control means 105, the reproduced signal digitization means 106, the synchronization means 107, and the jitter detection means 108 function similarly as those in the above-described conventional apparatus. In addition to the elements of the conventional apparatus, there are also provided the digitization level correction means 203 for adaptively correcting the reproduced signal digitization level so as to suppress the level of the jitter detection signal JTR, and sensitivity correction means 204 for correcting a jitter detection sensitivity based on a proportional coefficient DJA between the digitization level produced by the digitization level correction means and the jitter detection level.

As in Embodiment 1, the predetermined digitization level DD1 is set by the digitization level correction means 203. Based on the set digitization level, the reproduced signal digitization means 106 digitalizes the reproduced signal RRF read from the optical disk 101 by the pick up 102 so as to produce a digitalized reproduced signal DDS. A jitter component contained in DDS is detected as the jitter detection signal JTR by the jitter detection means 108, and the detection signal JTR is stored as DJ1 in the digitization level correction means 203. Similarly, a plurality of sets of data (DD2, DJ2), . . . , (DnN, JnN) and (AD1, AJ1), . . . , (DnP, JnP) are obtained, and the respective proportional functions FUN and FUP are computed.

Based on the proportional function FUN (proportional coefficient: a1) and the proportional function FUP (proportional coefficient: a2), the digitization level correction means 203 obtains an average value DJA of the absolute values of the proportional coefficients. The sensitivity correction means 204 receives the average value DJA, produces a jitter detection sensitivity correction signal JDF based on the value DJA, and sends it to the jitter detection means 108. Based on the sensitivity correction signal JDF, the sensitivity of the jitter detection means 108 is corrected so as to allow for absorption of variations resulting from the individual difference among circuits.

After completion of the above-described process, the process proceeds to a normal stand-by state.

In a double-speed or faster reproduction of a disk, or in the case of reproducing a disk such as DVD on which compressed data is recorded, the correction can always be made by performing the correction operation during an intermittent operation.

As described above, the digital data reproduction apparatus of this embodiment includes the optical disk 101, the pick up 102, the waveform equalization means 103, the error signal production means 104, the control means 105, the reproduced signal digitization means 106, the synchronization means 107, and the jitter detection means 108. The digitization level correction means 203 and the sensitivity correction means 204 for correcting the jitter detection sensitivity of the jitter detection means 108 are additionally provided, so that the detection sensitivity in detecting a jitter component contained in a reproduced signal is corrected for each circuit, thereby allowing for a high-precision jitter detection.

(Embodiment 9)

Figure 21:
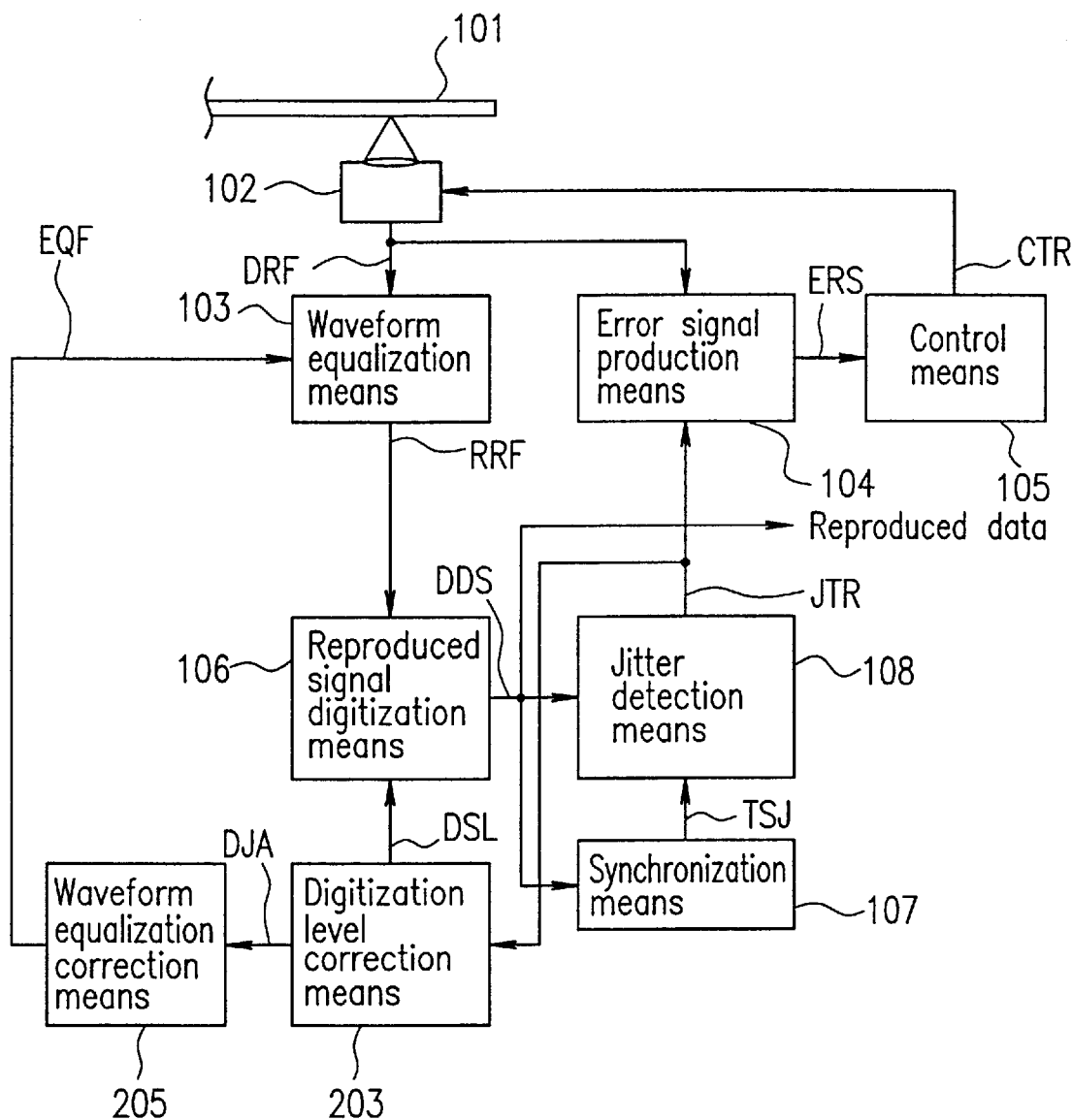
FIG. 21 is a block diagram illustrating a structure of a digital data reproduction apparatus according to Embodiment 9 of the present invention.

Now, another embodiment of the digital data reproduction apparatus of the present invention will be described with reference to a block diagram of FIG. 21 illustrating the structure thereof.

In FIG. 21, the optical disk 101, the pickup 102, the waveform equalization means 103, the error signal production means 104, the control means 105, the reproduced signal digitization means 106, the synchronization means 107, and the jitter detection means 108 function similarly as those in the above-described conventional apparatus. In addition to the elements of the conventional apparatus, there are also provided the digitization level correction means 203 for adaptively correcting the reproduced signal digitization level so as to suppress the level of the jitter detection signal JTR, and waveform equalization correction means 205 for correcting a waveform equalization coefficient of the waveform equalization means based on the proportional coefficient DJA between the digitization level produced by the digitization level correction means and the jitter detection level.

As in Embodiment 1, the predetermined digitization level DD1 is set by the digitization level correction means 203. Based on the set digitization level, the reproduced signal digitization means 106 digitalizes the reproduced signal RRF read from the optical disk 101 by the pick up 102 so as to produce a digitalized reproduced signal DDS. The digitization level correction means 203 obtains the average value DJA of the absolute values of the proportional coefficient between the digitization level DSL and the jitter detection signal level JTR and the proportional coefficient of the jitter detection signal level JTR.

The waveform equalization correction means 205 receives the average value DJA and produces a correction signal EQF based on the value DJA which is used for correcting the coefficient of the cut-off frequency used in a waveform equalization operation by the waveform equalization means 103. Based on the correction signal EQF, the coefficient of the cut-off frequency used in a waveform equalization operation by the waveform equalization means 103 is corrected so as to allow for absorption of variations resulting from the individual difference among circuits.

After completion of the above-described process, the process proceeds to a normal stand-by state.

In a double-speed or faster reproduction of a disk, or in the case of reproducing a disk such as DVD on which compressed data is recorded, the correction can always be made by performing the correction operation during an intermittent operation.

As described above, the digital data reproduction apparatus of this embodiment includes the optical disk 101, the pick up 102, the waveform equalization means 103, the error signal production means 104, the control means 105, the reproduced signal digitization means 106, the synchronization means 107, and the jitter detection means 108. The waveform equalization correction means 205 for correcting a waveform equalization coefficient of the waveform equalization means 103 is additionally provided, so that the cut-off frequency used in equalizing the waveform of a reproduced signal is corrected for each circuit, thereby improving the quality of the reproduced signal.

Figure 22:
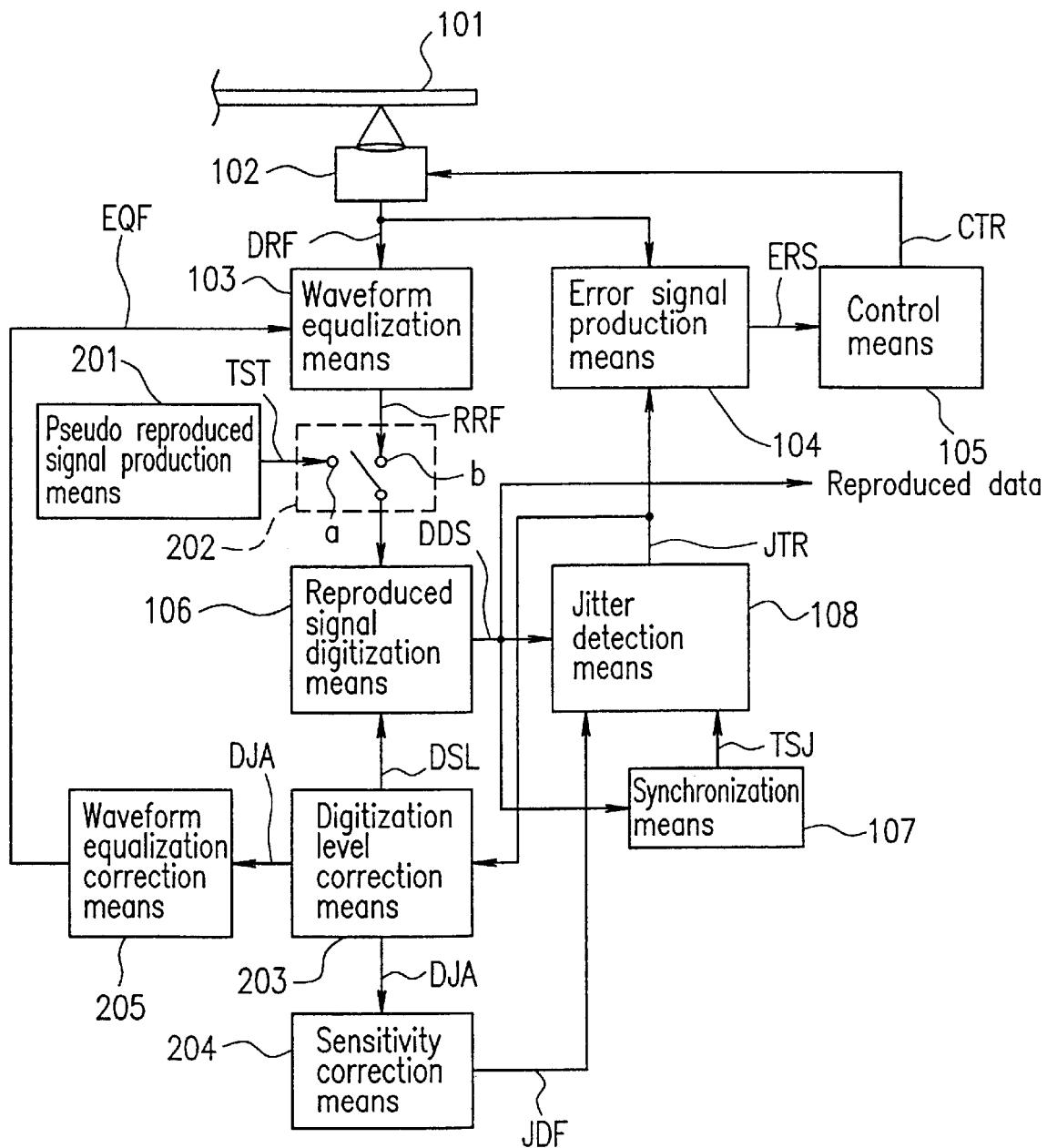
FIG. 22 is a block diagram illustrating a structure of a digital data reproduction apparatus according to Embodiment 10 of the present invention.
Figure 23:
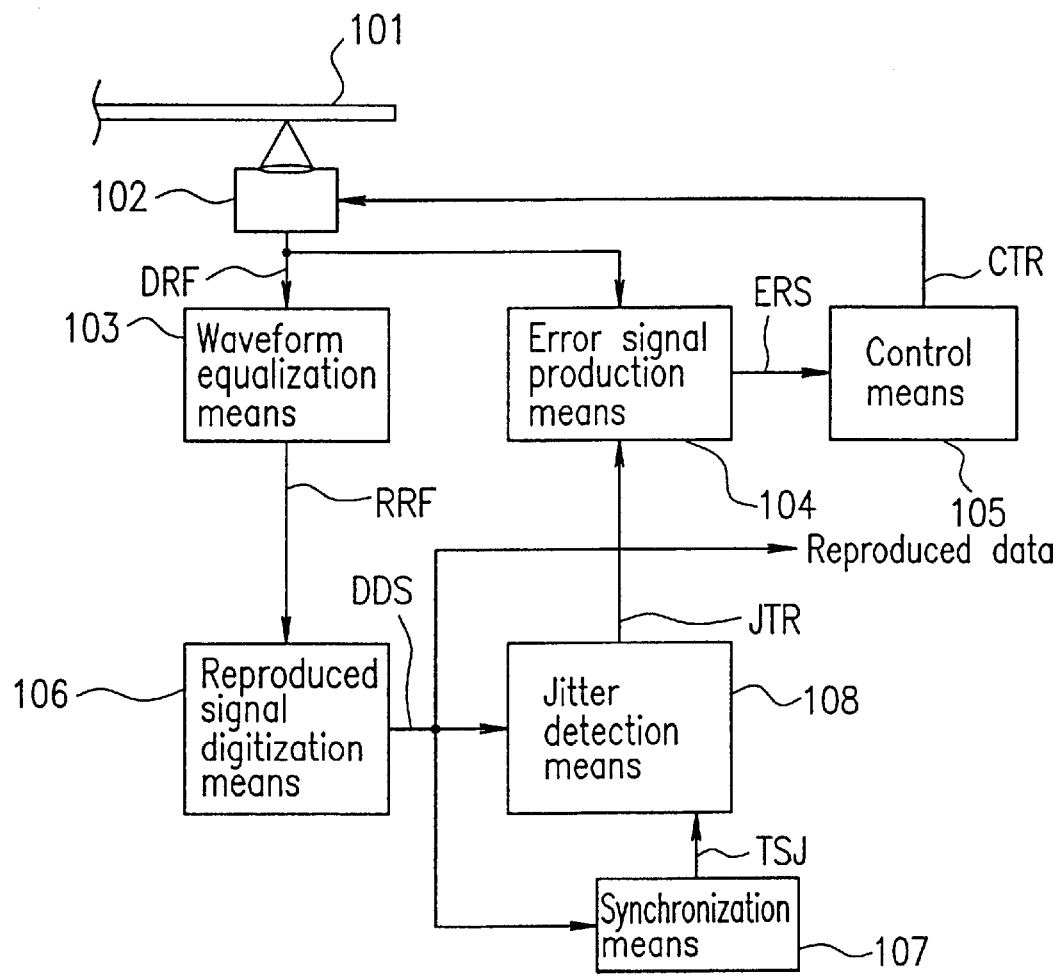
FIG. 23 is a block diagram illustrating a structure of a conventional digital data reproduction apparatus.

Any other correction using any appropriate combination of the above-described embodiments may be effective. In particular, in the structure as illustrated in the block diagram of FIG. 22, after the switch 202 has been switched to the side "a", a pseudo reproduced signal may be produced by the pseudo reproduced signal production means 201, based on which the reproduced signal digitization level DSL is corrected by the digitization level correction means 203, while computing the average value DJA of the proportional coefficients, which is sent to the sensitivity correction means 204 of Embodiment 8, for example. The detection sensitivity of the jitter detection means 108 is corrected by the sensitivity correction means 204 based on the average value DJA. The average value DJA of the proportional coefficients is also sent to the waveform equalization correction means 205 of Embodiment 9, for example. The waveform equalization correction means 205 receives the average value DJA of the proportional coefficients and corrects the cut-off frequency, which is the waveform equalization coefficient of the waveform equalization means 103.

Thus, the signal quality of a reproduced signal from an optical disk can be kept high, while ensuring the reproduction stability.

In all of the above-described embodiments, an optical disk is used as the recording medium, but the present invention is not limited thereto.

INDUSTRIAL APPLICABILITY

Thus, the digital data reproduction apparatus of the present invention provides the following advantageous effects:

(1) It is possible to correct the reproduced signal digitization level before actually reproducing a disk or a magnetic tape;

(2) It is possible to correct the reproduced signal digitization level to a level at which the jitter which may cause an error in reading the reproduced signal is minimized;

(3) It is possible to reduce the variations in the jitter detection sensitivity resulting from the individual difference among the jitter detection circuits; and (4) It is possible to reduce the variations in the cut-off frequency resulting from the individual difference among the waveform equalization circuits.

We claim:

1. A digital data reproduction apparatus, comprising: reproduced signal digitization means for digitizing a reproduced signal; synchronization means for producing a clock whose phase is synchronized with a leading edge and a trailing edge of the digitized signal produced by the reproduced signal digitization means; and jitter detection means for integrating and thereby converting absolute values of a phase errors between the digitized signal and the clock to a voltage value, the apparatus further comprising:

digitization level correction means for correcting a reproduced signal digitization level so as to minimize a signal produced by the jitter detection means;

pseudo reproduced signal production means for producing a pseudo reproduced signal; and a switch for switching a signal to be sent to the reproduced signal digitization means by selecting one of the signal produced by the pseudo reproduced signal production means and a normal reproduced signal.

2. A method for correcting a reproduced signal digitization level, the method comprising the steps of:

obtaining a first proportional function within a positive region and a second proportional function within a negative region from sets of a plurality of digitization levels and jitter levels corresponding to the plurality of digitization levels within the positive region and the negative region, wherein the positive region is defined as a region of a level higher than a reference value of the reproduced signal digitization level, and the negative region is defined as a region of a level lower than the reference value; and computing a digitization level at a crossing point between the first proportional function and the second proportional function for correction of a digitization level of a reproduced digital data signal.

3. A digital data reproduction apparatus, comprising: a detector for detecting digital data from a recording medium on which digital data is recorded; error signal production means for processing a signal from the detector so as to produce an error signal required for a control operation; control means for controlling the detector using the error signal; waveform equalization means for equalizing the signal from the detector; reproduced signal digitization means for converting a signal from the waveform equalization means to a digitized signal; synchronization means for producing a clock whose phase is synchronized with a leading edge and a trailing edge of the digitized signal which has been converted by the reproduced signal digitization means; and jitter detection means for integrating and thereby converting absolute values of phase errors between the digitized signal and the clock to a voltage value, wherein:

the digital data reproduction apparatus further comprises correction means for correcting a detection sensitivity of the jitter detection means; and the correction means comprises:
- digitization level correction means for correcting a reproduced signal digitization level so as to minimize a signal produced by the jitter detection means; and
- sensitivity correction means for correcting the detection sensitivity of the jitter detection means using a signal from the digitization level correction means.

4. A digital data reproduction apparatus according to claim 3, wherein the digital data reproduction apparatus further comprises:
- pseudo reproduced signal production means for producing a pseudo reproduced signal; and
- a switch for switching a signal to be sent to the reproduced signal digitization means by selecting one of the signal produced by the pseudo reproduced signal production means and a normal reproduced signal equalized by the waveform equalization means.

5. A digital data reproduction apparatus, comprising: a detector for detecting digital data from a recording medium on which digital data is recorded; error signal production means for processing a signal from the detector so as to produce an error signal required for a control operation; control means for controlling the detector using the error signal; waveform equalization means for equalizing the signal from the detector; reproduced signal digitization means for converting a signal from the waveform equalization means to a digitized signal; synchronization means for producing a clock whose phase is synchronized with a leading edge and a trailing edge of the digitized signal which has been converted by the reproduced signal digitization means; and jitter detection means for integrating and thereby converting absolute values of phase errors between the digitized signal and the clock to a voltage value, wherein:
- the digital data reproduction apparatus further comprises:
  - digitization level correction means for correcting a reproduced signal digitization level so as to minimize a signal produced by the jitter detection means; and
  - waveform equalization correction means for correcting waveform equalization coefficients of the waveform equalization means using a signal from the digitization level correction means.

6. A digital data reproduction apparatus according to claim 5, wherein the digital data reproduction apparatus further comprises:
- pseudo reproduced signal production means for producing a pseudo reproduced signal; and
- a switch for switching a signal to be sent to the reproduced signal digitization means by selecting one of the signal produced by the pseudo reproduced signal production means and a normal reproduced signal equalized by the waveform equalization means.

7. A method for correcting a reproduced signal digitization level, the method comprising:
- a first step of obtaining a first jitter level and a second jitter level respectively corresponding to a first digitization level within a positive region and a second digitization level within a negative region, wherein the positive region is defined as a region of a level higher than a reference value of the reproduced signal digitization level, and the negative region is defined as a region of a level lower than the reference value;
- a second step of obtaining a first digitization level and a second digitization level at which the first jitter level and the second jitter level are equal to each other; and
- a third step of correcting the reproduced signal digitization level based on an optimal digitization level, the optimal digitization level being a median point between the first digitization level and the second digitization level.

8. A method for correcting a reproduced signal digitization level according to claim 7, wherein the second step comprises a fourth step of varying the reproduced signal digitization level in a stepped manner so as to search for a first digitization level and a second digitization level at which the jitter levels are equal to each other.

9. A method for correcting a reproduced signal digitization level according to claim 7, wherein the second step comprises a fourth step of searching for the first digitization level and the second digitization level while always keeping an interval between the first digitization level and the second digitization level to be a constant interval.

10. A method for correcting are produced signal digitization level according to claim 7, wherein the second step comprises a fourth step of searching for the first digitization level and the second digitization level while keeping an interval between the first digitization level and the second digitization level to be equal to or greater than a predetermined interval.

11. A method for correcting are produced signal digitization level, the method comprising the steps of:
- obtaining a proportional function within one of a positive region and a negative region from sets of a plurality of digitization levels and jitter levels corresponding to the plurality of digitization levels, wherein the positive region is defined as a region of a level higher than a reference value of the reproduced signal digitization level, and the negative region is defined as a region of a level lower than the reference value; and
- correcting the reproduced signal digitization level based on an optimal digitization level, the optimal digitization level being a median point between a first digitization level existing within the other one of the regions different from the region within which the proportional function is obtained and a second digitization level which is obtained by applying, to the proportional function, a jitter level which is equal to the jitter level corresponding to the first digitization level.

12. A method for correcting a reproduced signal digitization level, the method comprising:
- a first step of varying a digitization level in a stepped manner in each of a positive region and a negative region so as to obtain a first optimal digitization level and a second optimal digitization level at which a jitter level corresponding to the digitization level is minimized, wherein the positive region is defined as a region of a level higher than a reference value of the reproduced signal digitization level, and the negative region is defined as a region of a level lower than the reference value; and
- a second step of obtaining an optimal digitization level for an entire region from the first optimal digitization level and the second optimal digitization level so as to correct the reproduced signal digitization level.

13. A method for correcting are produced signal digitization level according to claim 12, wherein the second step comprises a third step of correcting the reproduced signal digitization level based on an optimal digitization level for the entire region, the optimal digitization level being a median point between the first optimal digitization level and the second optimal digitization level.

* * * * *